United States Patent
Coslovi et al.

(10) Patent No.: US 9,977,654 B2
(45) Date of Patent: May 22, 2018

(54) METHOD OF DEVELOPING AN APPLICATION FOR EXECUTION IN A WORKFLOW MANAGEMENT SYSTEM AND APPARATUS TO ASSIST WITH GENERATION OF AN APPLICATION FOR EXECUTION IN A WORKFLOW MANAGEMENT SYSTEM

(71) Applicant: Asset S.r.l., Bergamo (IT)

(72) Inventors: Lorenzo Coslovi, Bergamo (IT); Alessandro Plebani, Romano di Lombardia (IT)

(73) Assignee: Asset, S.r.L., Bergamo (BG) (IT)

( * ) Notice: Subject to any disclaimer, the term of this patent is extended or adjusted under 35 U.S.C. 154(b) by 799 days.

(21) Appl. No.: 14/486,182

(22) Filed: Sep. 15, 2014

(65) Prior Publication Data
US 2015/0370540 A1    Dec. 24, 2015

(30) Foreign Application Priority Data
Jun. 20, 2014    (IT) .......................... TO2014A000492

(51) Int. Cl.
G06F 9/44    (2018.01)
G06Q 10/06    (2012.01)
G06Q 10/10    (2012.01)

(52) U.S. Cl.
CPC ................. G06F 8/20 (2013.01); G06F 8/71 (2013.01); G06Q 10/06 (2013.01); G06Q 10/103 (2013.01)

(58) Field of Classification Search
CPC ........................................................ G06F 8/20
USPC ........................................................ 717/121
See application file for complete search history.

(56) References Cited

U.S. PATENT DOCUMENTS

| | | | | |
|---|---|---|---|---|
| 2003/0046660 | A1* | 3/2003 | Watanabe | G06F 8/30 717/106 |
| 2003/0195789 | A1* | 10/2003 | Yen | G06Q 10/10 705/7.13 |
| 2006/0236304 | A1* | 10/2006 | Luo | G06F 8/34 717/105 |
| 2007/0256050 | A1* | 11/2007 | Behnia | G06F 8/70 717/104 |
| 2010/0293027 | A1* | 11/2010 | Du Fosse | G06Q 10/06 705/7.26 |

(Continued)

OTHER PUBLICATIONS

Herbert et al., Restructuring of workflows to minimise errors via stochastic model checking: An automated evolutionary approach, Reliability Engineering & System Safety, vol. 145, Jan. 2016, pp. 351-365.*

*Primary Examiner* — James D Rutten

(57) ABSTRACT

This disclosure provides techniques for facilitating workflow design and modification in a workflow management system. In one embodiment, software provides a design interface to an application developer to streamline transition definition and associated conditions and other parameters between phases of a workflow (and related rework for workflow modification), without requiring substantial manual recoding. The workflow management system accepts consequent data as metadata, which the system uses to enforce both state and required transition conditions to regulate how end-users interact with a database. The metadata is invoked during workflow execution in a manner tied to any desired condition and, thus, desired context.

18 Claims, 21 Drawing Sheets

(56) References Cited

U.S. PATENT DOCUMENTS

| | | | |
|---|---|---|---|
| 2011/0008023 A1* | 1/2011 | Potter | H04N 19/12 386/336 |
| 2013/0055201 A1* | 2/2013 | No | G06F 9/44 717/113 |
| 2013/0080139 A1* | 3/2013 | Novaes | G06F 13/10 703/20 |

* cited by examiner

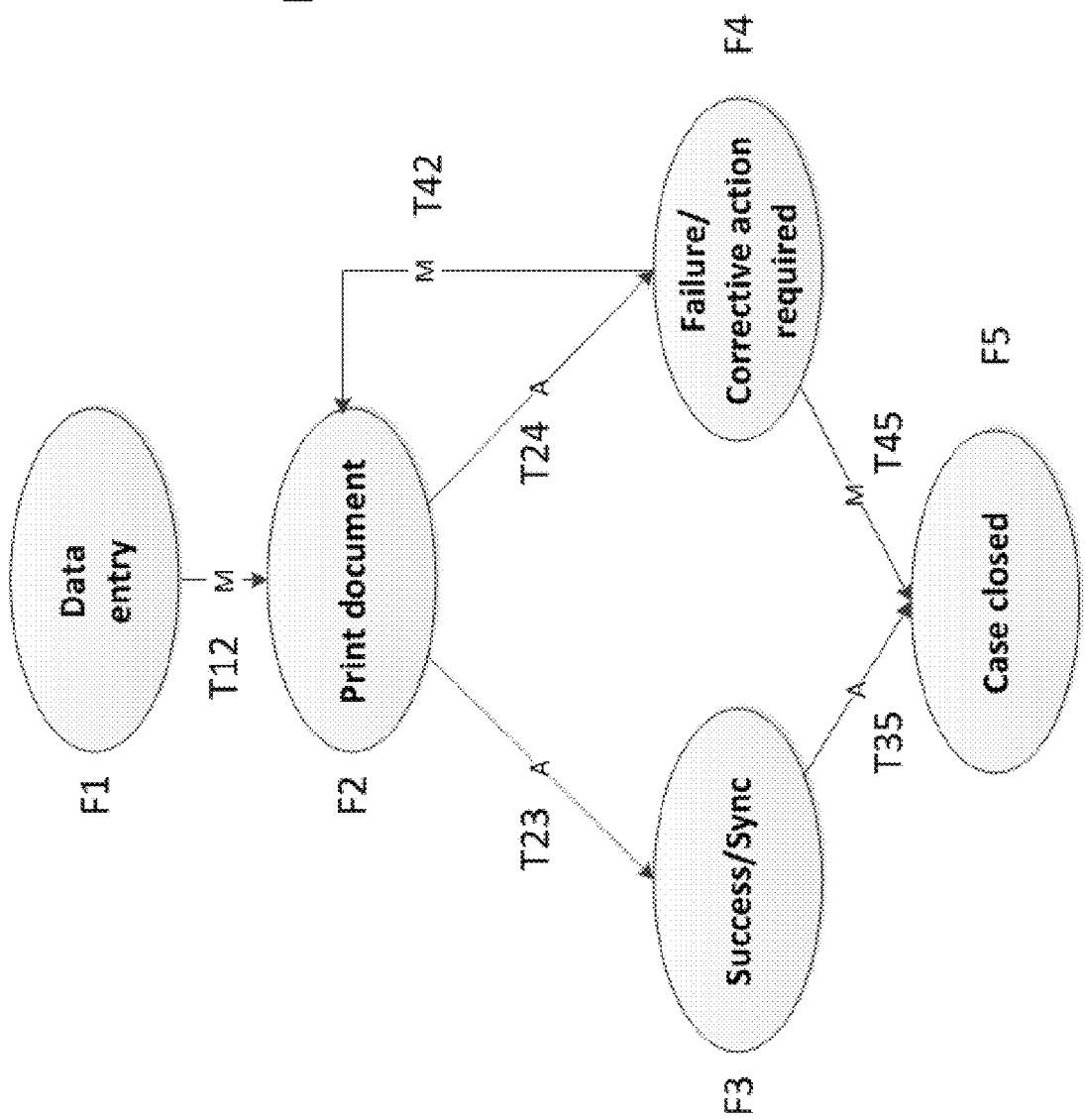

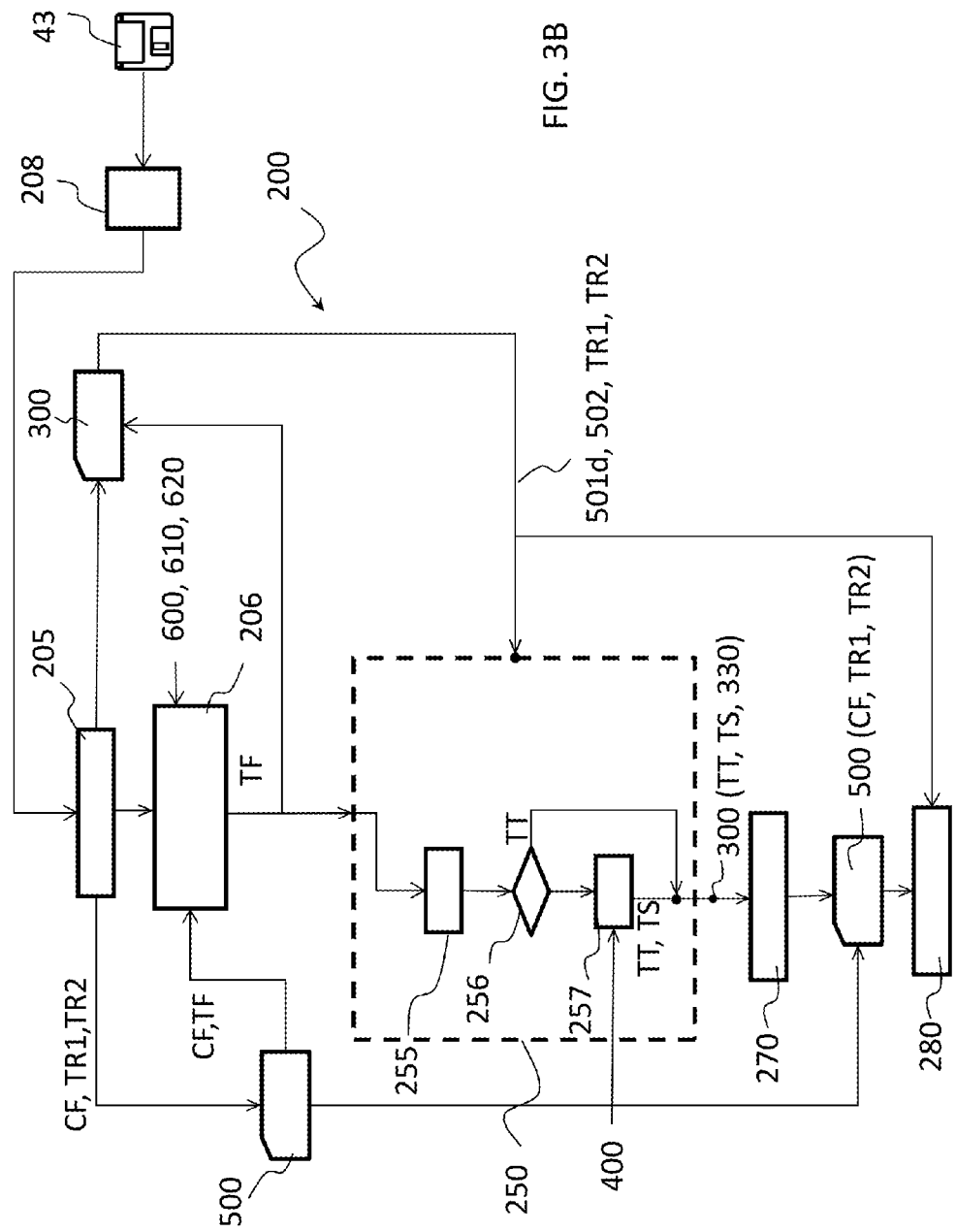

FIG. 8

Case Custom Field
Phase

General Properties
Field label   Phase
Record Type   Reprint

Picklist Values

Available Values
DI 160
DI 170
DI 180
DI 190
DI 200
DI 210
DI 050
DI 060
DI 070
DI 080
DI 120
DI 140
DI 150
DI 160
— 621

Add ▲
Remove ▼

Selected Values
DI 010
DI 040
DI 050
DI 150
IR 010
IR 020
IR 030
IR 040
RC 010
SL 010
SL 020
SL 030
— 622

— 623

Default  IR010 ▼

Save   Cancel

| Record type | Originating phase | Destination phase | Button properties | Button conditions | Button actions |
|---|---|---|---|---|---|
| ... | ... | ... | ... | ... | ... |
| ... | ... | ... | ... | ... | ... |
| ... | ... | ... | ... | ... | ... |

FIG. 16

METHOD OF DEVELOPING AN APPLICATION FOR EXECUTION IN A WORKFLOW MANAGEMENT SYSTEM AND APPARATUS TO ASSIST WITH GENERATION OF AN APPLICATION FOR EXECUTION IN A WORKFLOW MANAGEMENT SYSTEM

This application claims priority to Italian Patent Application No. TO2014A000492, filed for "method of developing an application for execution in a workflow management system and apparatus to assist with generation of an application for execution in a workflow management system" on behalf of first named inventor Lorenzo COSLOVI on Jun. 20, 2014. The aforementioned patent application is hereby incorporated by reference.

TECHNICAL FIELD

This disclosure relates to techniques for developing an application for a workflow management system, the workflow management system including a database, the application defining a workflow that involves interaction with the database, the workflow being representable as phases of workflow and transitions between the phases.

BACKGROUND

It is often necessary for technicians, typically programmer, to develop and manage an ensemble of work operations. These work operations can be developed and maintained with the aid of processing means, such as computers and computer systems, in a workflow management system.

For instance, in the field of customer relationship management (CRM), the adoption of software-based systems to help automate and manage business processes and their underlying logic is well-known. Such systems provide communication between employees of different corporate functions (e.g. sales, marketing, customer service and technical support) as well as mechanisms to synchronize tasks, as detailed in workflows representing the relevant sale, marketing or support processes. Such systems also facilitate paperless data entry, help reduce the risk of human error, and otherwise generally improve performance.

In a typical implementation, a desired workflow is enforced by an application operating upon data stored in a multitenant database. The application is typically designed in an object oriented environment, often using a programming framework provided by the workflow management system. The programming framework permits application design and configuration using high-level configuration tools specific to the workflow management system.

Optionally, the application is designed to be usable by and interact with users from different organizations or companies, and/or users working in different geographical locations, each via one or more servers, workstations or mobile devices. An example of a workflow management system is the well-known "Salesforce.com" environment.

The design of the application is usually based on design documentation written during an analysis phase, as well as on a process map that describes desired sequences of operations and data transformations required by the workflow as a whole. An application developer (e.g., a programmer) interprets this information, envisions the tasks to be executed, and uses the mentioned high-level configuration tools to define a suitable workflow within the capabilities and limits of the high-level configuration tools endemic to the workflow management system; when required, the application developer can also develop custom objects in an attempt to help overcome shortcomings of the configuration tools.

Implementation of a desired workflow is typically, however, heavily dependent on interpretation of the design documentation and capabilities provided by the high-level configuration tools (of a workflow management system) and the skills of a programmer. As such, care must be taken by the programmer to properly render the desired business logic. For example, the application developer typically needs to design the system in a manner that avoids entry into a state not consistent with the desired business logic. Furthermore, it should be appreciated that it is typically desired to provide on-screen information pertinent to the specific process or action context, in dependence on current logical state of the business process. As an example, it is typically desired to display instructions, checkboxes, drop down menus and other command or support functions which are suitable to a given context within the workflow.

Developing and maintaining the application within these constraints can be both expensive and time consuming, as the required contextual support typically requires a programmer to manually code each command or option made available to an end-user (e.g., active buttons) for each step of the desired workflow. This process is especially painstaking for workflow applications involving hundreds of possible transitions between processing stages, or other complex flow structure.

BRIEF SUMMARY

In the context outlined above, there emerges the need to make application development and maintenance in such environments less burdensome, and the need to simplify developer's tasks in the aforesaid circumstances: such as avoiding errors in triggering not allowed transitions, and in making easier the coding of user screens and actionable buttons related to a particular logic state according to the process business logic.

This, in particular, allowing to transpose into configuration tasks the coding of commands and the related actions made available to the user for each step of the process, and overcoming the drawbacks outlined above.

One or more embodiments aims to meet the above need(s).

In various embodiments, that object is achieved thanks to a method of developing an application for execution in a workflow management system having the characteristics specifically recited in the claims that follow.

Various embodiments also relates to an apparatus to assist with generation of an application for execution in a workflow management system, as well as a computer program product, loadable in the memory of at least one computer and including software code portions for implementing the steps of the method when the product is run on at least one computer. As used herein, reference to such a computer program product is intended to be equivalent to reference to a computer readable medium containing instructions for controlling a processing system to coordinate the implementation of the method according to the embodiments. Reference to "at least one computer" is evidently intended to highlight the possibility that the present embodiments may be implemented in a modular and/or distributed form.

The claims form an integral part of the technical teaching provided herein in relation to the embodiments.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 1B is state diagram representing the workflow of FIG. 1A.

FIG. 3B shows another embodiment of a method of designing a workflow.

FIG. 8 shows a user interface used to define phases available to the case management object of FIG. 7 according to an exemplary embodiment.

FIG. 16 shows a transition table.

DETAILED DESCRIPTION

Figure 1A:
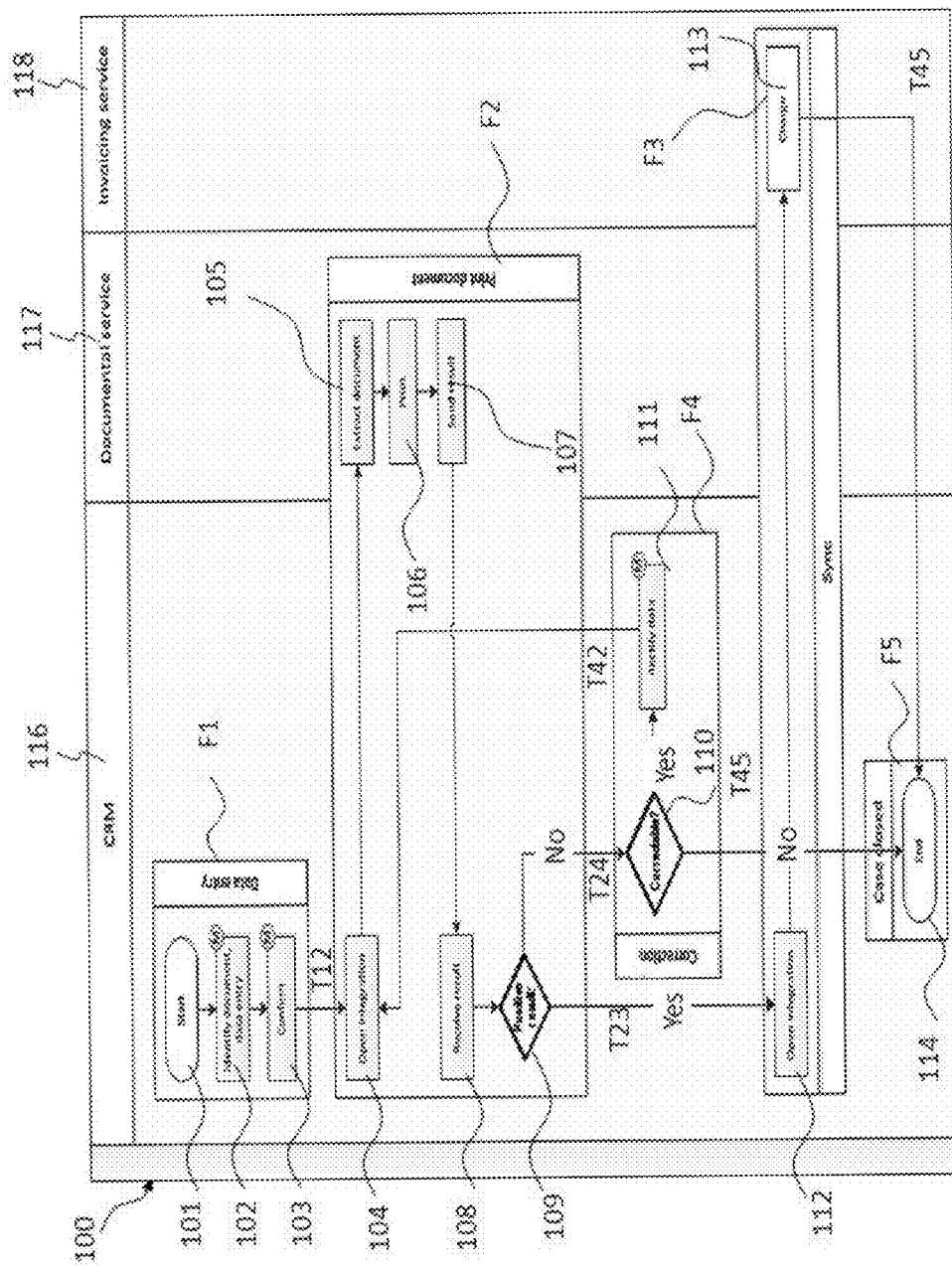
FIG. 1A is a flowchart showing an illustrative example of a hypothetical workflow.

This disclosure provides methods, devices, software and systems for developing applications for execution in a workflow management system. In one embodiment, these techniques include providing an application development interface, where the application development interface is to permit definition of process phases by an application developer. The application development interface is also to present a transition table to the application developer for the application developer to define permitted transitions between the defined phases.

The application development interface can be implemented to describe each transition using an automatic or a manual action parameter; when a manual action parameter is selected, a user interface provides a mechanism for the application developer to define one or more conditions to be satisfied in order for an end-user to access a database, and also to define available links, commands and other options available to an end-user. The application development interface generates metadata based on these definitions, and then associates this metadata with the desired workflow. The metadata is invoked during workflow execution to constrain transitions and end-user interaction with the database in a manner tied to any desired condition and, thus, desired context.

As should be apparent, the disclosed techniques simplify the development, maintenance and modification of a desired workflow. That is, for example, the disclosed techniques provide design mechanisms for representing states and transitions (e.g., via the mentioned-metadata) to enforce context-specific conditions and actions for each step or transition of a contemplated workflow. For specific implementations discussed below, the application development interface explicitly associates commands, buttons, menus and other workflow information with specific phases and/or transitions, providing a relatively straightforward mechanism for an application developer to understand how the process is implemented and whether a particular workflow step is associated with required or, conversely, excessive or inappropriate features.

Note that in specific embodiments described below, workflow design will be exemplified in context of the field of customer relationship management (CRM); it should be understood, however, that the techniques described herein are applicable to other fields as well.

Note also that various references will be made to an "application" that defines the operation of a desired workflow. Such an application can be a software application (meaning code that is sufficient to execute processes) as well as configuration information used by workflow-agnostic software (e.g., a generic workflow management system) to implement a specific workflow. For example, although not required for all embodiments, in one embodiment discussed below, such configuration information can include metadata. Thus, a general workflow management system can support multiple workflows applied against a common database, each workflow defined by its own set of metadata. Each set of metadata effectively customizes execution by the general workflow management system in a manner that implements a respective workflow.

FIG. 1A shows an exemplary process map 100 used to illustrate a hypothetical workflow, with desired operations distributed over three columns. This workflow will be presented first so as to provide an understanding of a design process might be approached for the particular workflow. The workflow, once created, is typically implemented in on a workflow management system, having hardware and software, as will be discussed below in connection with FIG. 2.

The three mentioned columns respectively represent operations executed by CRM software 116, a documental service 117, and an invoicing service 118.

Numeral 101 indicates the beginning of the process, while numeral 102 indicates manual input of user data for the purpose of identifying a document. The step referenced by numeral 102 requires user intervention, and is therefore depicted in FIG. 1A in a manner accompanied by a graphic consisting of a small, encircled "M." In the depicted example, numeral 103 indicates a step of confirming data entry, which is also seen to require user intervention.

In the depicted example, following user confirmation of document selection, the selected document is to be printed. To this effect, the user confirmation (103) triggers an open integration step 104, which effectively calls documental service 117. This integration enables (a) extracting the document 105, (b) printing the document 106, and (c) returning a result of the print operations 107 to the CRM software 116. The result is received by the CRM software 116 at step 108; if it is determined at step 109 that the print operation was successful, another open integration step 112 is then performed to initiate an invoicing service 118, with a client then being charged as appropriate (step 113). Following the invoicing event, control is then passed to a process end operation 114. If the print operation was not successful, the CRM software determines at step 110 whether the result can be corrected. If the result cannot be corrected, control is passed to a process end operation 114. However, if correction is permitted, step 111 is then executed to permit manual correction by the user; control is then passed back to the open integration step 104 in order to again attempt the print operations 105-107.

Summarizing the presented hypothetical workflow, the map 100 of FIG. 1A depicts a number of state and decision elements, represented by numerals 101-114. During a design process, the application developer analyzes these elements and makes a design choice to group them as phases F1-F5. In the example presented by FIG. 1A, it should be assumed that an application developer organizes elements 101-114 into five phases F1-F5. Transition descriptors T12, T23, T24, T42 and T45 define desired or permitted transitions between these phases. For example, transition T12 identifies a transition between phases F1 and F2 (i.e., from step 103 to step 104). Note that the example of FIG. 1A provides merely one example of a workflow, i.e., workflows can be applied to fields other than CRM, and can consist of a greater or fewer number of states, decisions, phases, transitions, services, or associated processes.

Note also that the phases can be equated in practice to finite or logical states of a state machine, with transition designations "T" representing transitions between these states. FIG. 1B provides a state diagram illustrating this relationship. Each phase can coincide with a single logical state or a group of logical states, and is characterized in that a transition from a given phase to a subsequent (logically allowed) phase takes place exclusively in response to an action. A manual action (as represented by transitions bearing the letter "M" in FIG. 1B) is typically a human action, while an automatic action (as represented by transitions bearing the letter "A" in FIG. 1B) is typically automatically invoked by the software application in response to specific events, conditions or criteria during the execution of the process.

Figure 2:
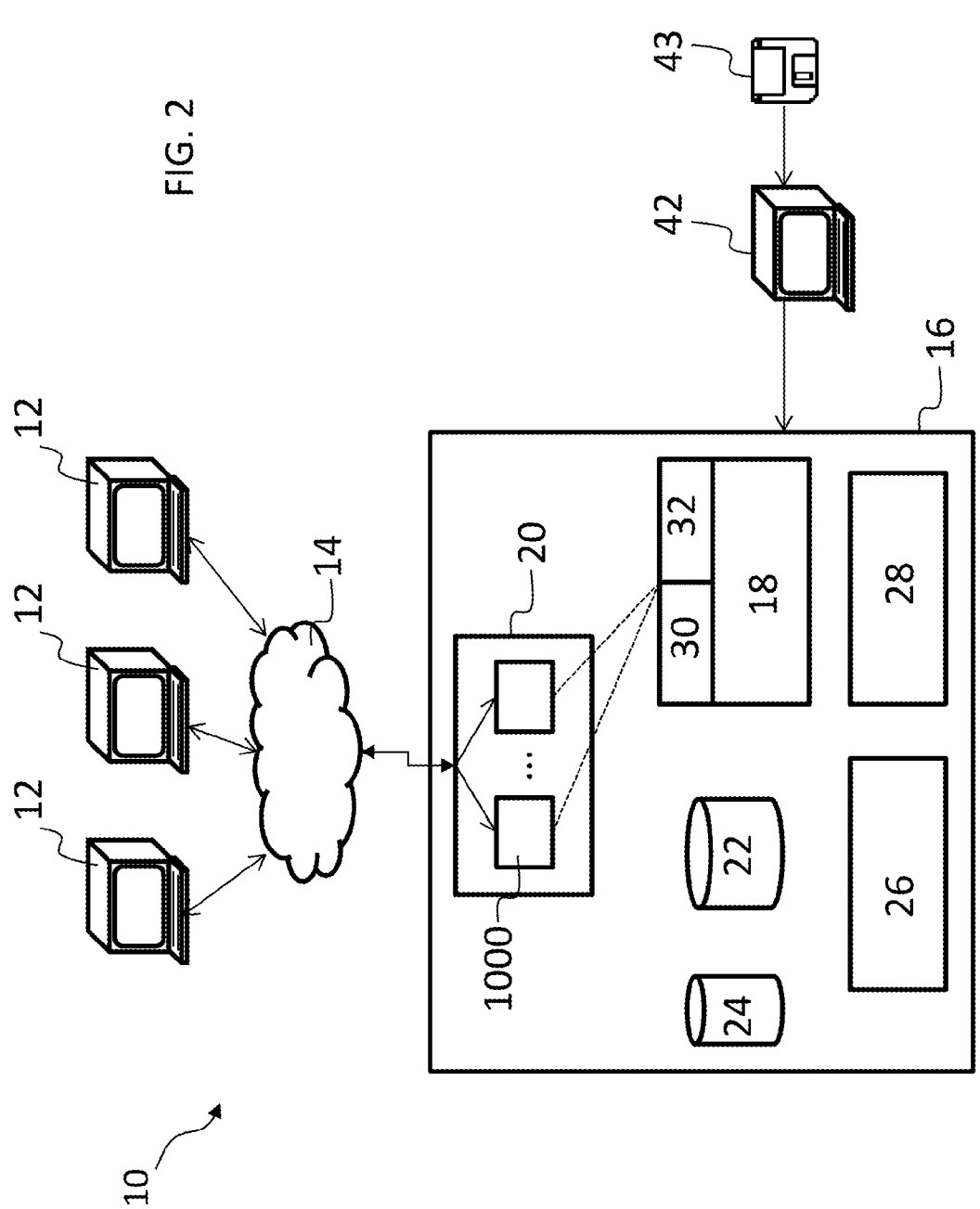
FIG. 2 is a diagram of an exemplary multitenant database environment.

FIG. 2 illustrates an exemplary architecture of a multitenant on-demand database environment 10 where workflow management might be used. As seen in FIG. 2, a number of end-user systems 12 are connected via a local or wide area network 14 to a workflow management system 16. The workflow management system 16 includes one or more processors (not separately shown in FIG. 2), an application platform 18, a network interface 20, a tenant data storage 22, system data storage 24, program code 26, and memory 28. Note that the workflow management system 16 can be implemented as one or more machines, for example, as one or more servers, personal computers, portable devices or other processing means, performing tasks on a cooperative, mutually-exclusive or shared basis. In the depicted embodiment, a desired workflow is defined according to program code 26 (e.g., an application and/or pertinent metadata). Such program code and/or metadata are designed in part by an application developer working on one or more machines 42 with the aid of workflow design software 43. The workflow design software 43 comprises instructions structured in a manner that, when executed, dictate the operations of machine(s) 42; these instructions are depicted as stored on non-transitory machine-readable media. The workflow definition software 43 causes the machine(s) 42 to present an application development interface to the application developer, as described earlier, to permit the application developer to define phases, transitions, action types, commands and associated conditions, and associated metadata. It is noted that machine(s) 42 and the workflow design software 43 are optionally an integral part of the workflow management system 16 or any end-user system 12 (although depicted separately in FIG. 2); that is, depending on embodiment, an end-user can also be an application developer and/or tenant, and design and workflow execution can be performed using any permutation or combination of end-user systems 12, workflow management system 16, or machine(s) 42.

Once in possession of the pertinent definitions and metadata, the workflow management system 16 then enforces rules instantiated by the metadata during run-time of the workflow management system (i.e., thereby constraining the way by which end-users will interact with the tenant data storage system 22).

Each end-user system 12 can be any machine or system that permits an end-user of the desired workflow to access a database. For example, any of end-user systems 12 can be a handheld computing device, a mobile phone, a laptop computer, a work station, and/or a network of computing devices. Note as mentioned that some or all end-user systems 12 can be combined with machine(s) 42, i.e., such that in one embodiment, end-users can design and customize their own workflows according to the teachings herein. An "end-user" can include anyone that manipulates data in the multitenant database environment, including individuals as well as intermediaries, service companies and any other entity that interacts with data stored in that database; for example, end-users can include third party application developers or software providers accessing the on-demand database service via corresponding end-user systems 12. Each group of one or more end-users that manipulate the same data with the same access and permissions and functions is generally referred to as a "tenant," i.e., such that a tenant can potentially be an individual end-user or a group of end-users (e.g., such as employees of a sales company). Finally, a "application developer" as used herein is typically one who designs or customizes an application to provide for a specific workflow (including pertinent data access); note again that these terms are not necessarily mutually-exclusive, e.g., in embodiment where end-users optionally design their own, respective workflows, each end-user can be an application developer as well as a tenant. Other examples are clearly possible.

As shown in FIG. 2, each each-user system 12 might interact via a network 14 with the workflow management system 16. The workflow management system 16 provides one or more on-demand database services, one or more applications and any supporting software. In descriptions below, an example will be predicated on a single workflow application, but it should be understood that there can be multiple such applications running on a single machine or collection of machines. Tenants for the specific workflow do not need to necessarily be concerned with building and/or maintaining of the workflow management system 16 or the database system, which is instead in one embodiment designed and maintained by one or more application developers using machine(s) 42. The database is available "on demand" for end-users that require access to the database system. Depending on application, the on-demand database services can store information from one or more tenants into tables of a common database image, to thereby form a multitenant database system (MTS). A database image can include one or more databases with a relational database management system (RDMS) or its equivalent being used to execute storage and retrieval of information against the individual databases or their constituent objects.

The application platform 18 provides a framework that allows each application of the workflow management system to run and that enables optional creation and maintenance of each such application. The application platform 18 can also host third party software applications (which may or may not include the components of the workflow management system 16 or a specific workflow application at-issue). When executed, each application can be instantiated as one or more virtual machines in the process space of the workflow management system 16, permitting the associated creation, deletion and manipulation of various database objects.

Different tenants can have different capabilities with regard to accessing and modifying application and database information, depending on a tenant's security or permission level and depending on the particular workflow that is to be designed. Support for these capabilities and related security measures is typically designed into the desired workflow by the application developer using machine 42, although the specification of individual access permissions can be reserved to the provider of the workflow management system or an administrator. As an example, it may be desired to provide a first tenant with data entry capabilities and to deny these capabilities (and provide other capabilities) to a second tenant; the application developer can provide for multiple classes of access, and either the application developer or someone else (e.g., an administrator) can then assign specific tenants to specific ones of the multiple classes. Related to this distinction, the memory 28 of the workflow management system can include individual tenant and/or end-user process spaces and a tenant management process space. The tenant database 22 can be divided into individual end-user storage areas, either on the basis of a physical arrangement or a logical arrangement. Within each storage area, storage and pertinent application configuration data (including any tenant-specific metadata) can similarly be allocated for each tenant.

The network 14 can be a LAN (local area network), WAN (wide area network, such as the Internet), a wireless network, a point-to-point network, a star network, a token ring network, a hub network, or any other appropriate configuration. In a typical application, end-user systems and/or machine 42 communicate with system 16 using various protocols such as transmission control protocol (e.g., TCP/IP), hyper-text transfer protocol (HTTP), file-transfer protocol (FTP), and so forth. The network interface 20 can be implemented as one or more HTTP application servers 1000 cooperating with the application platform 18, tenant data storage 22, and the system data storage 24. Application servers might connect to the application platform 18 using different network connections and protocols, such as TCP/IP.

In an example where HTTP is used, an end-user system 12 typically includes an HTTP client (e.g., a web browser) for sending and receiving HTTP messages to and from an HTTP server at the workflow management system 16. Each end-user system 12 and/or application developer's machine 42 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with various pages, forms, applications and other information discussed below. For example, a user interface device can be used to access data and applications hosted by workflow management system 16, to perform searches on stored data, and to otherwise allow interaction with various graphical user interface (GUI) pages that may be presented to a tenant, end-user, administrator, application developer or other entity.

The application platform 18 includes a user interface (UI) 30 and an application programming interface (API) 32 to permit end-users, tenants, administrators and/or application developers to interact with the workflow management system 16, optionally via end-user systems 12 and/or machine(s) 42. The application platform 18 also includes utilities that support application creation and management in an automated or partially automated way, for example, permitting application developers to save metadata into the tenant database (and/or each tenant-specific storage, as appropriate) using save routines executed as part of one or more tenant processes. Invocations to such processes in one embodiment are coded using Apex, to provide a programming language style interface extension to the API 32. Such invocations can be detected by one or more system processes, which manage the retrieval of application metadata for the specific tenant and the execution of the pertinent metadata via a virtual machine.

As an example, one tenant might be a company that employs a sales force where individual end-users (e.g., salespersons) use the workflow management system 16 to manage the company's sales process by interacting with a database in a common manner. As part of this interaction, each end-user might interact with contact data, leads data, customer follow-up data, performance data, goals and progress data, and so forth, applicable to that company's sales process, all by logging to the workflow management system 16 through one or more end-user systems 12. The various end-user systems 12 in this context communicate with application servers 1000 to request and update system-level and tenant-level data from the workflow management system 16; this may require one or more queries to system database 22 and/or the tenant database 24 (e.g. with one or more SQL queries designed to access the desired information).

Each database can generally be viewed as a collection of objects, such as a set of logical tables, containing data fitted into predefined categories. Each table and/or object generally contains one or more data categories logically arranged in one or more rows, columns, records or fields in a viewable schema. In turn, each row, column or record of a table contains an instance of data for each category defined by the fields. For example, a table might describe a purchase order, including fields for information such as customer, product, sale price, date, etc.

In some multitenant database systems, depending on implementation, tenants can be permitted to create and store custom objects or to customize standard objects, for example, by creating custom fields for standard objects. Also in some database systems, end-users and/or tenants can be provided with the ability to create, post and exchange workflow applications (e.g., exchange specific workflows or associated metadata); for example, this can be performed using a shared directory, bulletin board or social networking scheme. In yet another embodiment, workflows can be nested, e.g., with individual tenants interacting with a multitenant database according to a first workflow, and with tenants being provided each with the ability to design and employ a second workflow, within a specific step or context of the first workflow, to execute specific processes.

Note that an application can optionally be embodied as a group or package of multitenant database setup data (e.g., metadata) that defines a data model, user interface operation and/or business logic. That is, as mentioned above, in such an embodiment, the workflow management system 16 provides execution software and the database, while the specific software application that defines the workflow provides configuration information for accessing, modifying and displaying data of said database using control structures of the workflow management system. An application developer can define a specific application as a metadata "package" which includes some or all of the setup data (e.g., custom object definitions, page layout definitions, workflow rules, etc.), necessary to define the specific application. Each application can also include code written in different languages (such as Apex or javascript) and/or files such as word processor documents. Note that a metadata-based structure is not required for all implementations, e.g., in another embodiment, each application can instead be primarily embodied as self-contained execution software.

In one embodiment, application developers and/or tenants can register their applications in a central directory. A directory can be implemented to optionally include a public portion and a private portion, or otherwise structured in a way where applications can be selectively shared with or without write (or modification) permission. Such a directory can be built for example using JSP pages and Java classes. Such a structure permits other entities to browse published applications and selectively employ applications designed by others. Permissions can be optionally restricted to tenants of a common multitenant environment. In other embodiments, permissions can also be extended to entities that are not tenants of a common multitenant environment.

With general environment for a workflow management system being thus introduced, this disclosure will now provide additional detail regarding the design and implementation of workflows.

Figure 3A:
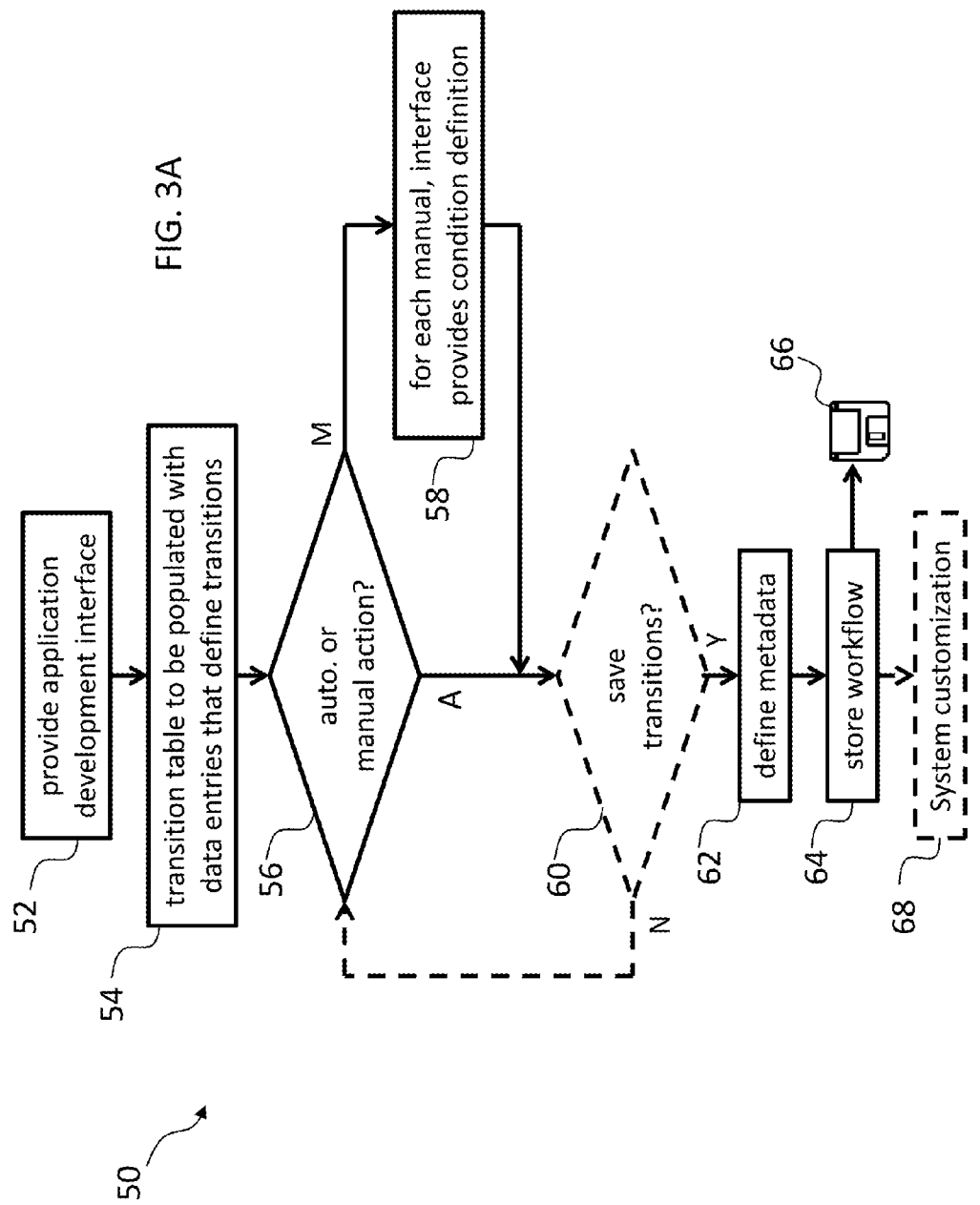
FIG. 3A shows one embodiment of a method of designing a workflow.

More specifically, as noted earlier, application developers can be provided with an application development interface that facilitates automated or partially-automated development of a workflow, in a manner where metadata is used to invoke context-specific rules during workflow execution. A first embodiment of such a process is generally represented by numeral 50 in FIG. 3A. An application developer initiates a design function and is provided by workflow design software with an application development interface, per numeral 52. As noted earlier, the application developer alone or acting with others defines phases of a desired workflow and associated, permitted transitions. The interface provides access to a transition table that permits definition of actions associated with each transition, per numeral 54. More specifically, the transition table is populated for each transition that is to be permitted between any two phases of the workflow with an action parameter, with each action parameter representing either an automatic (A) or manual (M) action type. Automatic (A) action types as noted earlier are action types that are to be automatically invoked and processed by the workflow management system during execution of a workflow, whereas manual (M) action types require some type of user intervention, typically by an end-user. Depending on each specified action type, per decision block 56, the workflow design software permits a user to define conditions precedent for database access to be provided for manual (M) action types (and, optionally, actions such as update functions for automatic (A) action types), e.g., via a drop-down menu, checkbox or similar design function; this will be exemplified further below. The application developer is either at this time permitted to save created transitions created in the transition table, or alternatively, such transitions are saved as a bulk process, per numeral 60. Based on the transition table, as created or modified, metadata is generated, as referenced by numeral 62. Finally, the created workflow (including such metadata) is stored onto non-transitory machine-readable media 66, as relayed by function box 64. Note that in one embodiment, as represented by optional process block 68, the method can include customizing a legacy workflow application to support a novel workflow structure designed according to the mentioned techniques, for example, by configuring native software and/or creating extensions that permit execution of a customer workflow produced according to techniques discussed herein.

FIG. 3B shows another embodiment 200 of a method for designing an application representing a workflow, where the application is to be defined in term of phases F and transitions T. It should be assumed for purposes of this embodiment that a case object will be created and manipulated using the programming framework provided by a conventional workflow management system (e.g., salesforce.com), with appropriate customization as necessary. This customization, referenced as a whole by block 205 in FIG. 3B, can optionally be performed by installation of software on a workflow management system, with associated configuration. This installation/execution is represented by function block 208, which in turn is driven by on instructions on non-transitory machine readable media 43. The resultant modifications result in:

installation of one or more additional software modules in the workflow management system; in a particular object-based embodiment, this will include a phase management object 300 and associated user interfaces and triggers, represented by numeral 300; and customization of the tools of the programming framework, in particular of a request management object (e.g., the "case" object exemplified by the discussion below); this object is represented in FIG. 3B by numeral 500.

The following concepts might be helpful in understanding this implementation.

object: in multitenant database, particularly one associated with workflow management, a unitary structure that can be stored or referenced and that typically includes data, one or more functions, and/or a pointer to a location. In various embodiments pertaining a workforce environment an object may also be associated to a layout which defines how the data are displayed in such workforce environment, i.e. the arrangement of the data on a page and possibly other graphic attributes.

case: a specific record of the multitenant database, for example, a database entry used to track an individual customer service request and a related "ticket;" each new case is represented as an object (i.e., a specific request management object).

record-type: a differentiation specific to the workflow or workflow management system that allows one to distinguish between different types of tickets or items that can be represented by a common object; different layouts (such as where fields are positioned in a page), and different pick list sets can each be associated with each different record-type; for example, one record-type discussed below ("complaint") might be used to track a customer complaint, whereas a different record-type ("reprint") might be used to track a customer request for ordering a specific document; the record-type is sometimes specific to each different business process that is mapped onto case objects.

pick-list: a type of selection mechanism that holds a variable (developer-defined) set of selections for a corresponding object.

visual force: a type of dynamic page written using Apex; Such a page can be inserted to effectively proxy dynamic display of a portion of a user interface to insert variable content in that portion of the user interface, for example, a variable selection of command buttons.

trigger: code that is automatically executed in response to certain events, such as upon changing an entry in a record (e.g., adding, updating, or deleting an entry); the trigger can be employed for example upon a save process to detect inconsistencies (errors) to help to maintain the integrity of the workflow application and/or of information stored in the database.

In the discussion that follows, references will be made to configuring objects (e.g., standard objects used in legacy workflow management system or new objects) in a workflow management system, with exemplary, hypothetical workflow rooted in a CRM environment. Thus, the type of object under discussion will typically be a customer request object, specifically, a "case" object used to document a particular service request from a customer. Each case object would in practice be created by an end-user who initially fields the customer request, but for purposes of this discussion, the customization provided for workflow design results in modification of the format (e.g., data structure) of this object to support the workflow application design principles provided by this disclosure. A particular field of this object that will be referred to below is the "record-type" field, which is populated by an end-user initially fielding a customer request to indicate whether the particular request is a "complaint," a request for a "reprint," and so forth. The techniques discussed herein can be used for example to design an application which implements the workflow of FIGS. 1A and 1B, and this exemplary workflow will be used in some of the narratives provided below. Note that while the discussion below focuses of "case" objects (as being a specific example of a customer relationship management object), it is of course possible to apply disclosed techniques without limitation to other types of objects, including any objects used by legacy workflow management systems (such as provided by Salesforce.com).

It was mentioned above that process 208 results in installation of one or more additional software modules (300) and customization of a request management object (e.g., the "case" object) 500. The additional software modules 300 (typically performed once, as a preliminary process) add an application development interface as introduced above and associated specific screens, tools and interfaces to facilitate the definition of phases and associated transitions. This facilitation is achieved in part using a transition matrix, discussed below, and associated triggers, features and related consistency checks. The customization of the request management object refers to the addition of a "phase" field CF. That is, as noted earlier, in some embodiments, metadata can be created in such a way as to permit association of specific rules and conditions with specific transitions; in order to facilitate this process in a manner compatible with a conventional workflow management system (e.g., salesforce.com), an additional phase field is advantageously associated with the case object at setup (in addition to any native fields supported by that object). The phase field is defined in such a manner that it permits association of each case object with a single state or, alternatively, a grouping of multiple logic states.

Following the installation/customization operation 205, a setup operation 206 is performed to define an object (e.g., the case request management object for a CRM application) representative of a given data model, as part of the process of designing a specific workflow. This operation is better explained by reference to a flow chart seen in FIG. 4.

Figure 4:
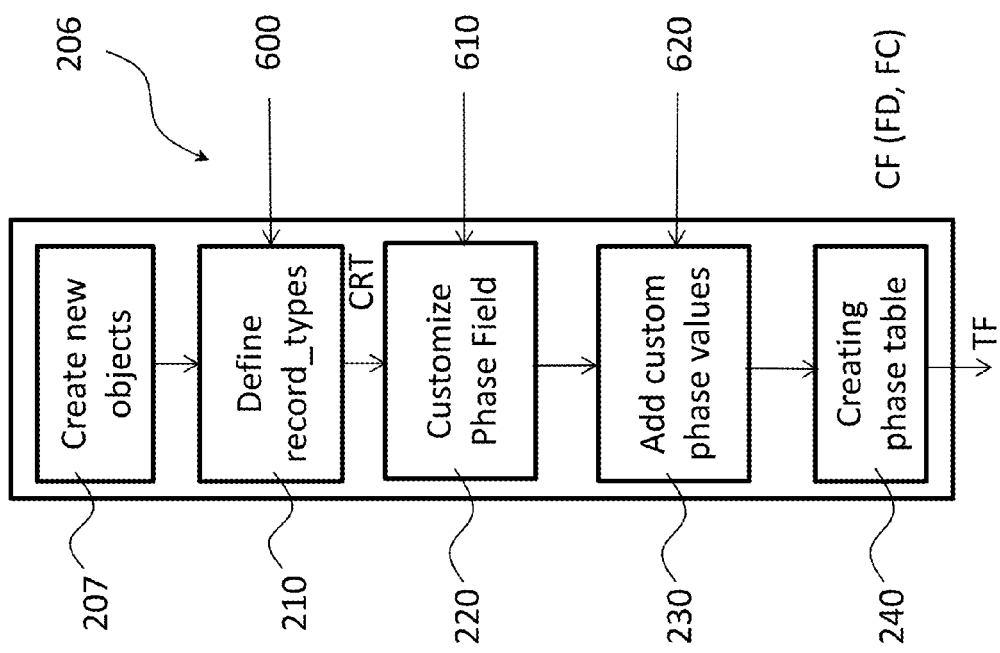
FIG. 4 is a flow diagram of a method of creating an object structure that supports phase and transition-specific definitions, according to an exemplary embodiment.

Referring briefly to FIG. 4, this setup operation 206 determines the format for the request management object (for a CRM application), specifically, defining its fields (such as permitted record-types, phases and so forth). A first step 207 formats the case object. This step comprises organizing data into object-specific fields and application-specific fields which can be associated with specific data interfaces, such as particular layouts and data views that correspond to specific states of the workflow. This format also is structured to automatically include a further phase field CF, which will be used to define code references to such data interfaces, and triggers (e.g., TR1 and TR2) to be executed at certain milestones automatically to ensure transition and phase consistency.

A second step 210 is then performed to select a template specific to the workflow being implemented, for example, to populate each field with any default layouts/data interfaces and permitted selection values, and so forth, specific to the type of workflow to be implemented. For example, this second step 210 can be used to prepopulate the "record-type" field with a default set of predefined categorizations (e.g., "complaint," "reprint," etc.) available for use with a specific CRM workflow. This selection can also be used to associate the object under design with layouts and/or data interfaces which have been previously associated with each categorization (e.g., with each predefined record-type).

A third step 220 is then performed to add new phases of the type required for the particular workflow, if not already defined in the system. These phases are the different functional groupings referenced earlier, typically determined during the analysis phase of the design process. Step 230 is then performed to customize the phase field CF, in effect, to define the various phases of the specific workflow to be implemented (and for which the application developer can potentially define transitions). For example, it is possible to have many phases and logical operations with multiple workflows, with each workflow interacting with only a subset of the phases and logical operations; step 230 is typically performed so as to associate what are effectively global phases with specific (individual) workflows. If desired, steps 220 and 230 can be interchanged. Steps 220 and 230 are in effect performed to define phases pertinent to the object under design, in a manner that can be imported to permit creation of a phase table TF (step 240). The various steps depicted in FIG. 4 represent a preliminary preparation operation, specifically, to define phases F and transitions of the workflow.

Note that while the example presented above describes building the request management object, adopting one or more templates and adding phase support, the described processes can also be applied to legacy workflow management systems, for example, by modifying an existent request management object.

Returning to FIG. 3B, creation of the phase table TF provides a predicate for use of a phase manager object 300. The phase manager object 300 provides a transition matrix TS and/or transition table TT that can be used (in dependence on the phase table TF) to define permitted transitions between phases, any associated rules, conditions or interactions, and also to establish a framework for consistency checks and other processes. The phase manager object 300 will be used to generate metadata, as introduced above, and to dictate triggers and consistency checks, as discussed below. Operation 250 is invoked to populate the phase table; when completed and when object 300 is closed, triggers specified by the phase manager object 300 are executed to perform consistency checks. For example, in one embodiment, first and second triggers (TR1 and TR2) are used, to provide consistency checks and to decode phase codes into phase descriptions respectively; the first trigger TR1 is employed to examine the resulting tables (i.e., transition table TT and/or transition matrix TS and/or phase table TF) to check compatibility of the transitions T to be executed, while the second trigger TR2 is employed to look in the phase table TF and transition table TT to retrieve the explicit description FP of each phase F to be executed. Case object 500 also comprises a module (i.e., a dynamic page) which, dependent on table TT, presents action buttons (e.g., buttons, links, commands, lists, checkboxes and so forth) for use in managing the phases F during the design process.

The step of new case object creation effectively ascribes to case object 500 a set of metadata comprising all set-up data, such as object definitions, page layouts, and workflow rules that represent the corresponding workflow application. Note that, if retrofitted to an existing workflow management system framework (e.g., by the customization referred to above), the principles here described customize an existing object format through the addition of the phase field CF, the associated transition table and/or matrix, and any triggers suitable to the workflow, e.g., triggers TR1 and TR2. This then facilitates phase definition and software controls that operate automatically on the defined phases (represented by the phase field CF). Thus, the modification of object 500 creates a data model that can be used by different workflows, and also provides user interfaces adapted to facilitate workflow customization and modification. The software customization and/or such modification also provides user interfaces to readily define new objects and the fields to be associated with those objects, and to readily add new fields to existing (e.g., legacy) objects. Finally, the modification of object 500 also provides both a means of customizing record-types and other fields with parameters (e.g., layouts, conditions, visualizations, behavior, e.g.) unique to such fields and a means of populating such fields with any desired, predetermined parameters (e.g., according to templates).

Figure 5:
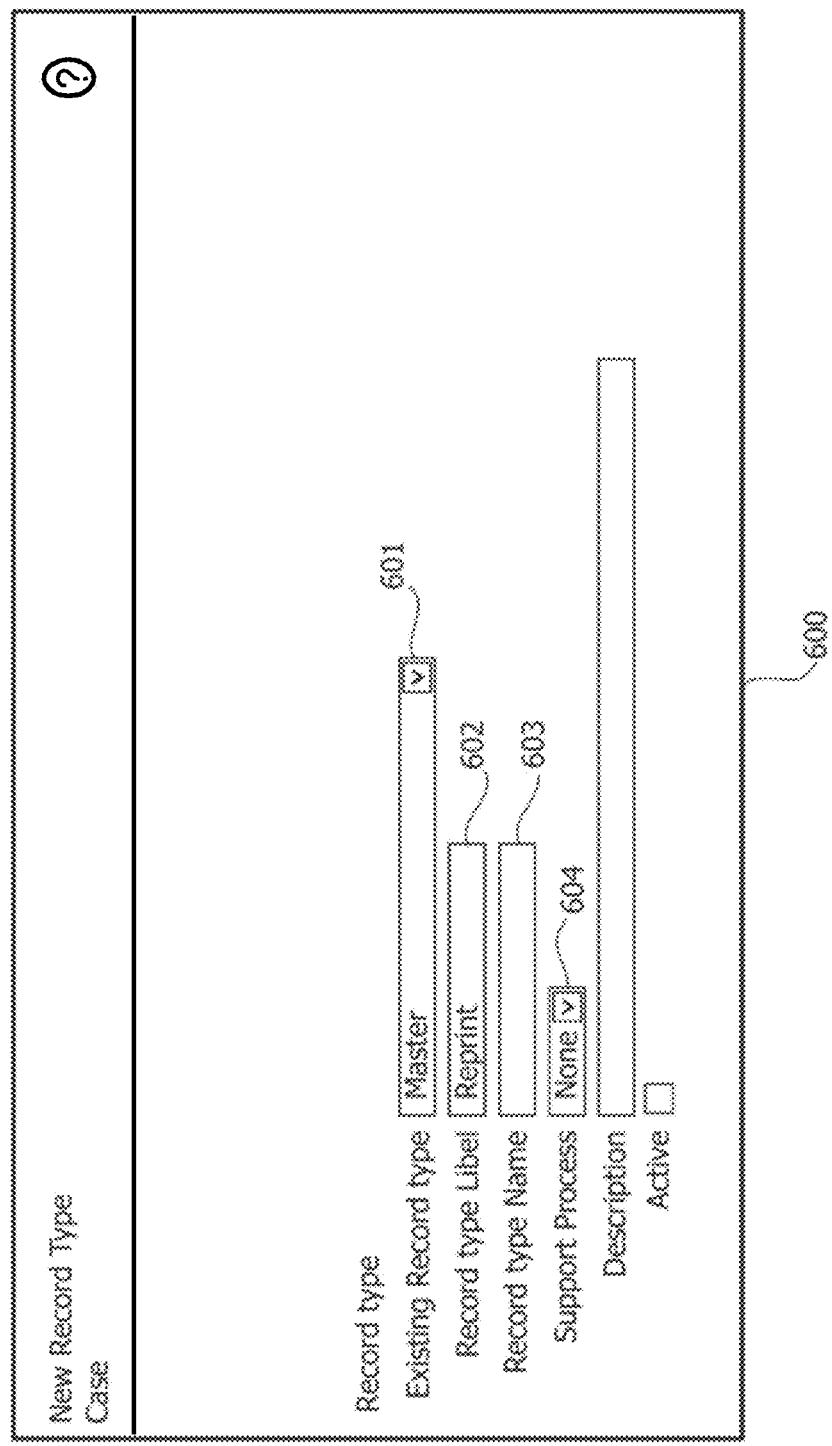
FIG. 5 shows a user interface used to define case objects according to an exemplary embodiment.

Exemplifying these principles, an object used by a legacy workflow management system can be readily customized to add, edit or delete permitted field values, for example, using operation 210 of FIG. 4. As noted, the techniques provided by this disclosure provide a user interface, exemplified by FIG. 5, to customize such values. Recalling the example just introduced, if a workflow is to be modified or designed to accommodate a customer request for a reprint, then a record-type field (for example, of the case object) could be defined to include a selectable value of "reprint." Similarly, if a record-type value of "complaint" is to be defined to support an expansion of an existing workflow, the object design would be modified accordingly, to permit individual case objects (e.g., new tickets) to be identified as a "complaint." FIG. 5 shows an exemplary input screen layout 600 (i.e., a user interface) for performing this design operation. Such an input screen layout allows the application developer to input information to define "record_type," e.g., using field 601 to designate an existing record-type as a template, field 602 for a record-type label (in this example "Reprint"), field 603 for a record-type name, and field 604 to define a support process type. Completing the requested information is effective to create a new record-type, in a manner associated with the request management object 500 for the particular workflow.

Figure 6:
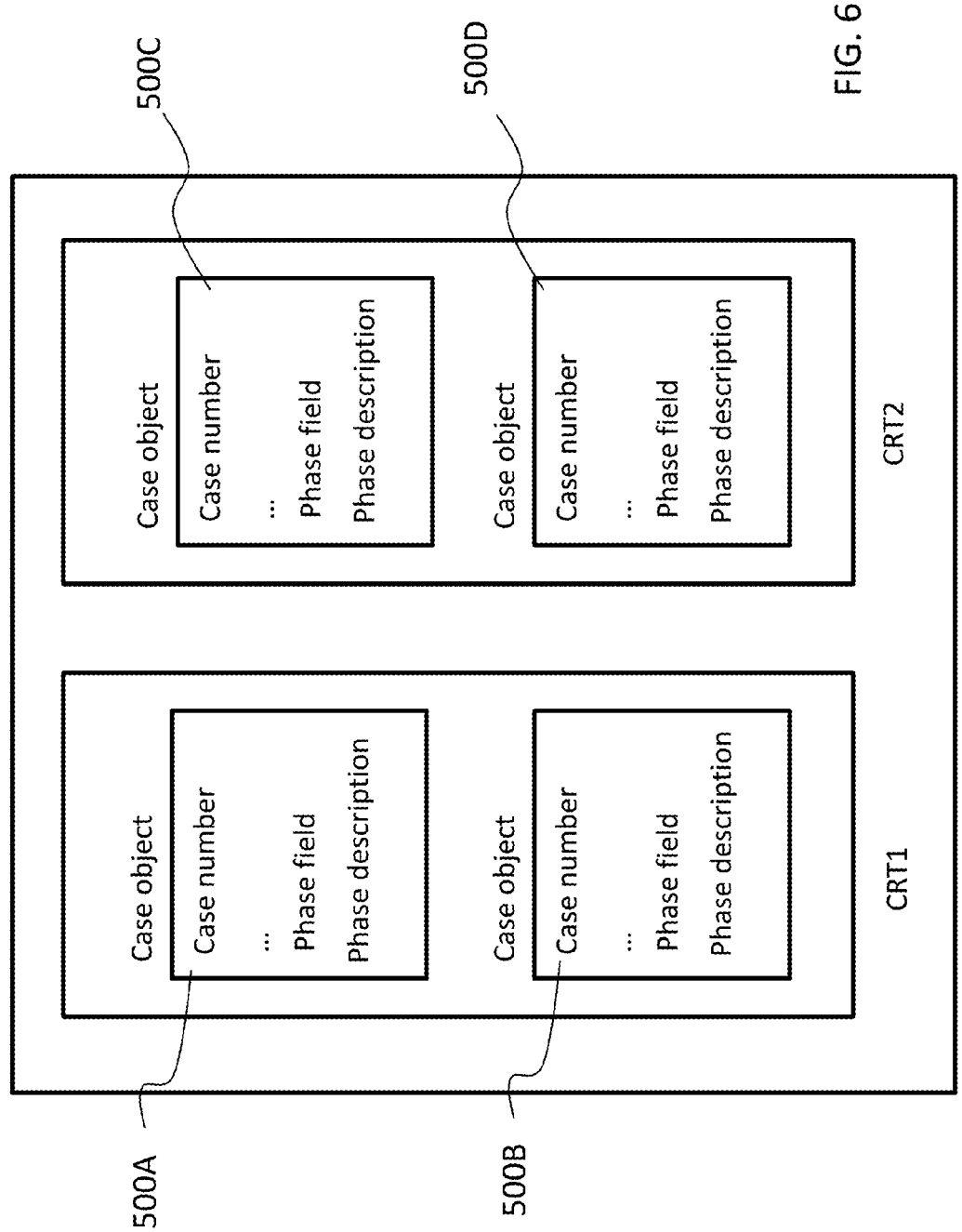
FIG. 6 illustrates a case object structure.

FIG. 6 is a diagram providing additional information regarding the definition of specific record-types. For each process to be implemented using a newly-defined or modified case object 500, each relevant record-type is defined. In FIG. 6, "CRT1" and "CRT2" indicate two record-types that, according to the processes they implement, are used for case objects 500A and 500B, and 500C and 500D respectively. Each record-type is seen to have its own case number, phase field CF and phase description.

Returning to FIG. 4, via process 210, a name and description for the new record-type CRT are entered. The new record-type will populated to include all pick-list values available (e.g., as a default, or previously-defined) for that record-type. Note that the software is advantageously structured such that, after saving the new record-type, it is possible for the application developer to customize the pick-list value, including values that can be selected for the phase field CF.

The definition of the record-type CRT affects the system in a number of respects, and this definition is therefore advantageously followed by configuration of the related layout (visualization) and, as appropriate, any relevant end-user profiles.

As mentioned above, the standard request management object of the workflow management system and the corresponding layout is customized to include, among its fields, a custom field phase field CF. This field CF includes in one embodiment a pick-list type field that holds for selection a complete list of all values corresponding to phases of all record-types for the pertinent workflow. The application developer selects from among the phases defined for the workflow to define a set of phases pertinent to the particular object. For example, applying the example of FIGS. 1A-1B, one might select codes representing phases F1-F5 from a complete list of phases for an overall workflow and enter these in association with the request management object. This process and the associated user interface permit ready modification of existing workflow to customize how an object is used, or its associated workflow. The phases, once again, are determined from the analysis phase of the project.

Figure 7:
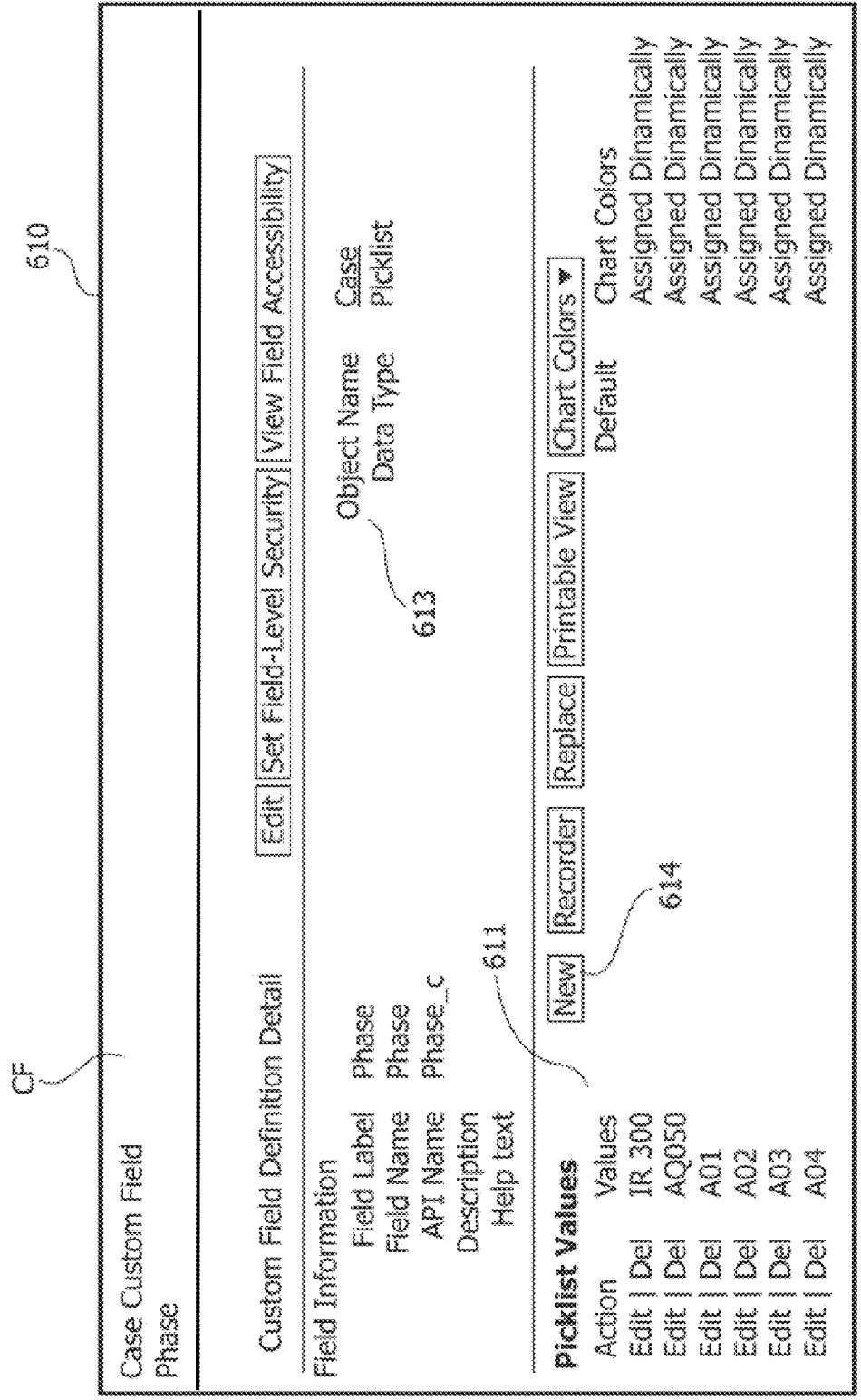
FIG. 7 shows a user interface used to configure a case management object according to an exemplary embodiment and, in particular, to define a phase field CF for the case management object.

FIG. 7 shows an exemplary configuration tab (i.e., a layout for a user interface) 610 for customizing fields of the database environment, specifically, for configuring available selection values for a specific field of the request management object. In the particular case depicted by FIG. 7, it is desired to specify available selections for the phase field, with an end-user's selection options typically defined by the application developer (i.e., responsive to the analysis phase, as mentioned). As mentioned, in one embodiment, the phase field CF holds by default all the possible phases for all record-types. The tab 610 can be used by the application developer to add, edit or delete phases or individual phase parameters (such as codes for a phase, and other indicated fields) for the application to be implemented.

The tab 610 is seen to include an informative section 613 that displays information such as the field, label, name, API name, object name (e.g., "case" in this example). Numeral 611 refers to a selection mechanism used to populate values for the field (e.g., with this example showing use of a pick-list to select a pertinent phases). At any point in the process, the user can utilize button 614 to select new values for the pick-list (or conversely to reorder and/or remove values, for example). Note that other selection, action and command mechanisms can be provided for, as would be understood by those skilled in the art.

Reflecting on the foregoing, to add or customize an object, an application developer utilizes a user interface (represented by the screenshot of FIG. 7) to define pertinent phases as dictated by the desired workflow; as each record-type can have its own respective selection options (e.g., a respective list of pertinent phases), this process facilitates ready modification of workflow as new phases are added, whether during or after the workflow design process.

FIG. 8 shows another exemplary configuration tab (or user interface layout) 623, relating to a pick-list for defining the various phases of a desired workflow. For example, this user interface can be entered responsive to application developer-selection of button 614, discussed above. The application developer selects from a set of available (existing) values 621 to define pick-list selections. As each value is selected and added as a selection option (via a right-arrow button seen at the center of the page), that value is added to a set 622 of selection values available to the pick-list for the specific record-type under consideration. Conversely, by highlighting a specific value from set 622 and selecting a left-arrow button seen at the center of the FIG., a user can edit previously-selected options by removing one or more phases from use as selection options.

Figure 9:
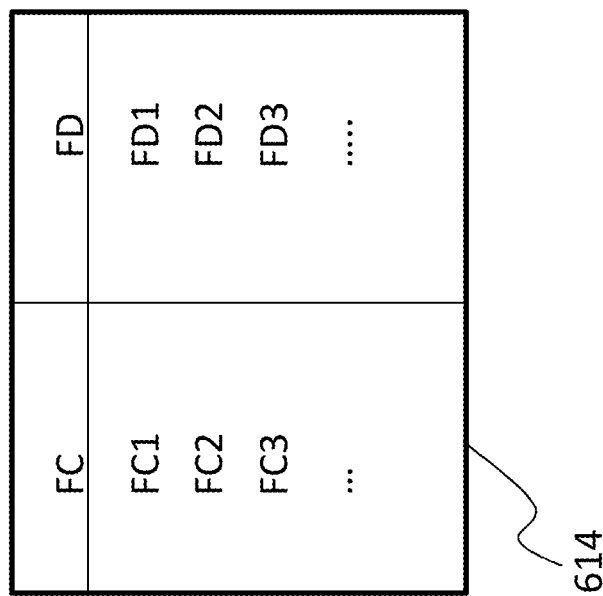
FIG. 9 presents a table of phase descriptions (right column) and corresponding phase codes (left column).

As can be seen from this FIG., each phase value is represented in the phase field CF in this embodiment by an alphanumerical code respective to each phase of the workflow process. A corresponding phase description holds a textual description of the phase for reference purposes, and can be selected by double-clicking the pertinent alphanumeric code to load a phase description look-up table, such as represented in FIG. 9 by numeral 614. This table is populated as new phase selection options are added to the workflow. The look-up table 614 has two fields, including an alphanumerical phase code "FC" and a textual phase description "FD." Note that this is not required for all embodiments and, as with many exemplary user interfaces described in this disclosure, it can be implemented by alternative means. For example, in another embodiment, a textual description for a value can be automatically retrieved and displayed as part of the user interface of FIG. 8 any time the application developer highlights a specific alphanumeric code. Clearly, other alternatives are also possible.

Figure 10:
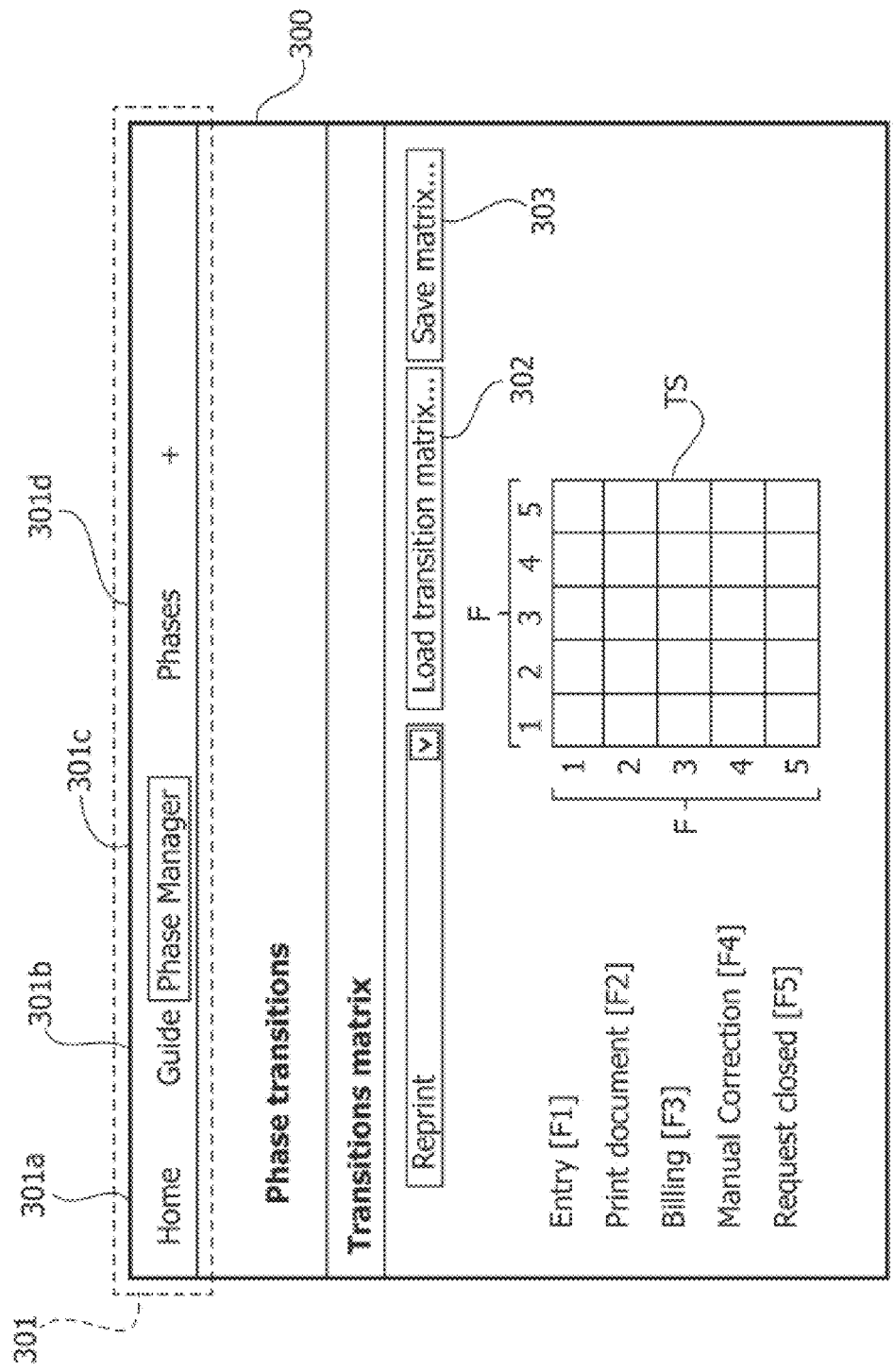
FIG. 10 shows a user interface employed to define phase transitions according to an exemplary embodiment.
Figure 11:
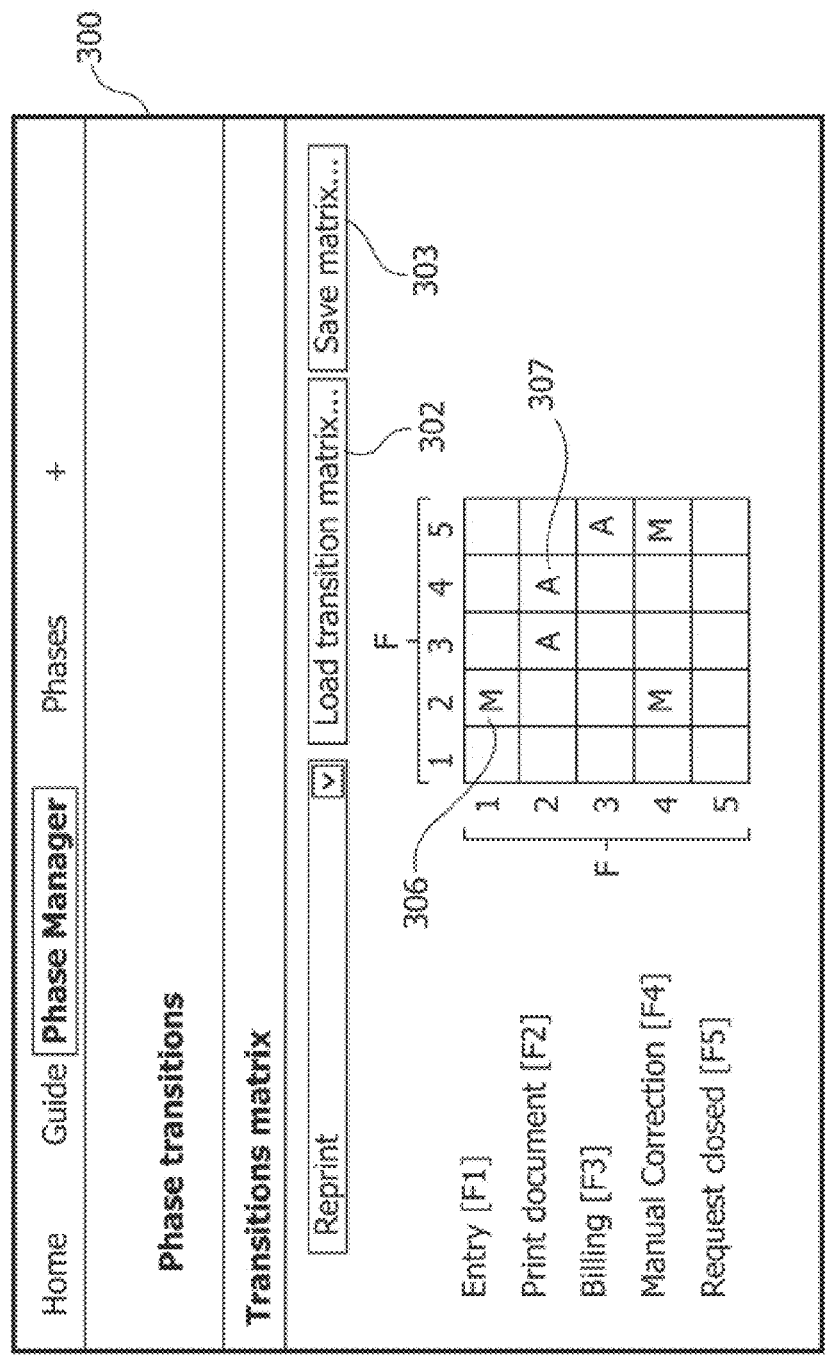
FIG. 11 shows the user interface of FIG. 10, but in this case, in a manner populated by action types that define several permitted phase transitions.
Figure 12:
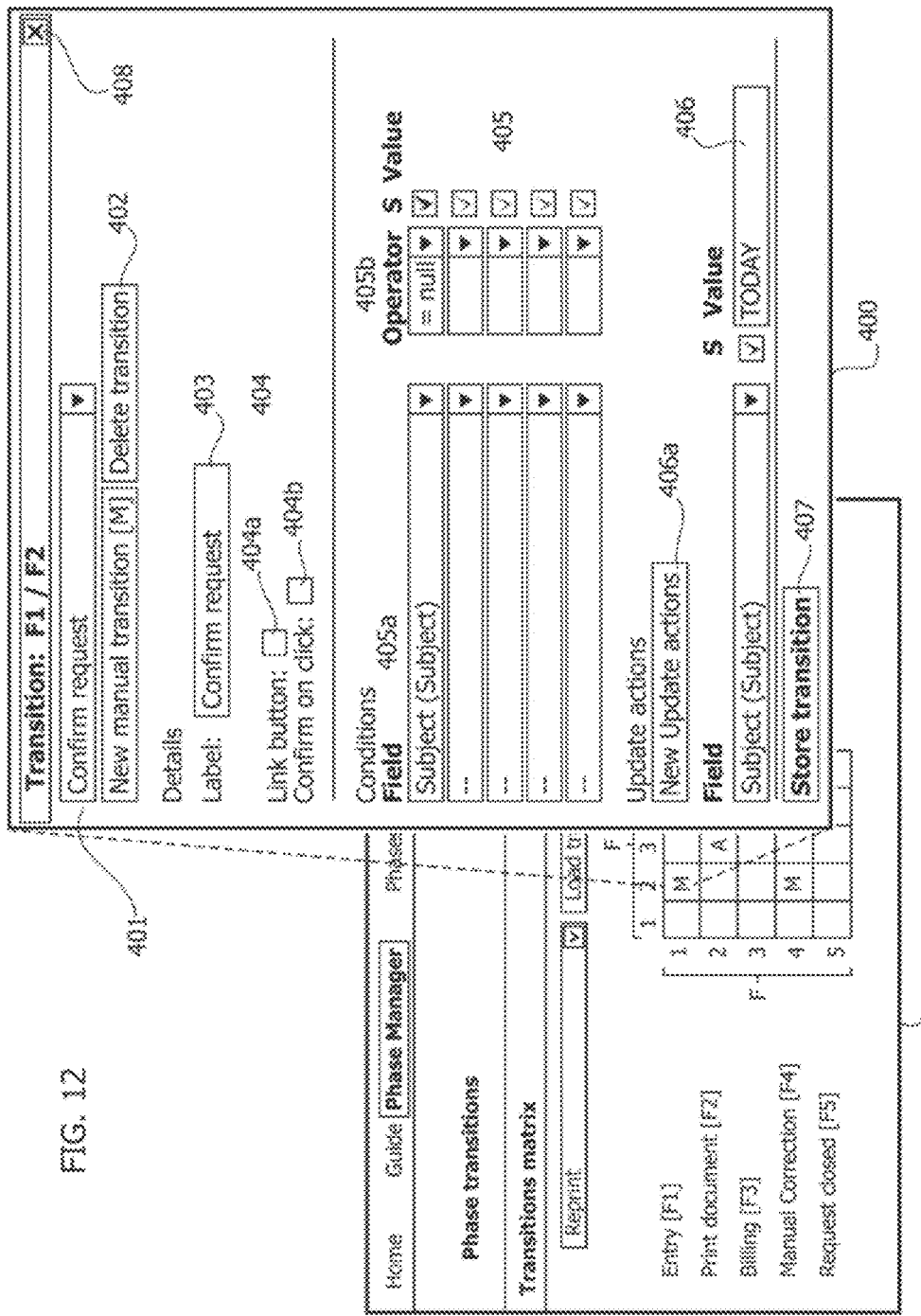
FIG. 12 shows a pop-up dialog employed in connection with the user interface of FIGS. 10 and 11.

Once the set of phases F relevant to the desired workflow have been defined, those phases F are added to the phase management object 300, defined in step 205 (FIG. 3B). This object is then used to define permitted transitions. A layout for this object is seen in FIGS. 10, 11 and 12. That is to say, this object provides a user interface for transition definition to define all permitted transitions between phases of the desired workflow and to configure those transitions. This task can also be performed using a standard massive record import tool (e.g. Apex DataLoader, or a similar Microsoft Excel connector) if supported by the particular workflow management system.

Returning to FIG. 3B, pursuant to operation 250, a transition matrix TS is built and used to generate the transition table TT in operation 255. By means of the layout of the phase management object 300 (see FIGS. 10, 11 and 12), the intersections representing each possible transition between any two relevant phases of the desired workflow are automatically presented to the application developer as part of the pertinent user interface. In particular, in step 256, the application developer is called upon to specify whether each desired transition T is manual or automatic. Phase transitions T that are to be automatic (e.g., which are not conditioned upon providing buttons or action links or otherwise requiring end-user input) are marked with an "A." Manual phase transitions requiring an on-screen action by an end-user (even if only a confirmation) are marked with "M." Storage of such a transition table as a controlling object of the workflow process is then immediately effective to dictate operation of the desired workflow, in a manner that prohibits any attempted phase transition not expressly provided for by the transition matrix TS and/or transition table TT. This is enforced in particular by retrieving and checking information from the matrix TS through corresponding Apex triggers, set to operate on the case object.

Then, in operation 257, the application developer is called upon to configure by means of an additional action configuration tool 400, buttons, commands or links that an end-user can display and click upon in order to effectuate the parameters needed for completion of any manual action-type (M).

To provide some non-limiting examples, such actionable buttons can include the following.

conditional: the transition is available and (is optionally displayed to an end-user as available) when certain conditions precedent for the case object are satisfied (e.g. some buttons can be made available and displayed to specific user profiles).

dispositive: when the action button is clicked by an end-user, the button triggers the saving of data and the assignment of values to other fields of the case object useful to track workflow events (e.g. the date when such action was performed).

Additional detail regarding operation 257 is further detailed in FIG. 12. For example, numerals 401, 402, 404*a*-*b*, 405*a*-*b*, 406 and 407 all illustrate fields than can be set to conditions, parameters and context for any desired manual transition. The depicted user interface can be invoke in response to a selection of the manual action parameter (M), upon saving a populated transition table, or at any other suitable point in the process.

Once operations 255 and 257 have been completed, the request management object 500 (e.g., a case object) is created (or accordingly updated) via operation 270. The request management object 500 comprises a set of metadata, which includes all set-up data, such as object definitions, page layouts, and in particular, the workflow rules, that will be used to configure the specific application. The set of metadata is used to provide configuration and rules used by a workflow management system to implement the desired workflow. For a legacy environment, software can extend the capabilities of existent objects by modifying those objects to provide for a phase field CF, transition definition support, and metadata (defined for example by a phase management tool object). The metadata defines for object 500 and its associated layout, action definition parameters, and for those actions defined to be manual in nature, parameters for governing end-user interaction with transitions in phase.

For sake of simplicity, the terms "case" or "ticket" will be used to refer to the interaction of the application with a specific case record (for example, initiated in response to a customer query).

Before further describing FIGS. 10, 11 and 12, it would be helpful to provide additional discussion relating to a hypothetical workflow process. This example and its ensuing discussion will illustrate the steps of operation 255 (seen in FIG. 3B).

For example, it should be assumed that a hypothetical record-type structure "CRT" with the related phases F of a case object comprises the following case types and associated phases F.

Case type: "Complaint."
Phase "F1", phase description: "Case logged."
Phase "F2", phase description: "Send letter."
Phase "F9", phase description: "Case closed."
Case type: "RMA."
Phase "F1", phase description: "Case logged."
Phase "F4", phase description: "Print document."
Phase "F9", phase description: "Case closed."
Case type: "Customer data update."
Phase "F1", phase description: "Case logged."
Phase "F4", phase description: "Print document."
Phase "F9", phase description: "Case closed."
Case type: "Reprint document."
Phase "F1", phase description: "Case logged/Data entry."
Phase "F2", phase description: "Print Document."
Phase "F4", phase description: "Failure, requires intervention."
Phase "F7", phase description: "Success, alignment"
Phase "F9", phase description: "Case closed"

This hypothetical example represents four different case types, respectively corresponding to four different hypothetical service requests, "complaint," "RMA," "customer data update," and "document reprint." Each different case type (i.e., type of service request) is processed using different phases of workflow.

FIG. 10 shows a first configuration of a phase management object 300. The example depicted in FIG. 10 corresponds to data pertinent to the print example from FIGS. 1A and 1B. The layout of object 300 is seen to comprise a set 301 of four different tabs: tab 301a, which is selected to return to the default home page tab; tab 301b, which is selected to access a guide for using the user interface; tab 301c, which is selected to invoke the transition matrix TS tab (or other user interface to define transitions and/or action parameters); and tab 301d, i.e., a phase tab which is selected by the application developer to configure available phases. In general, the phase configuration object 300 includes data structures and layouts for data visualization/management of each of the depicted tabs, including identification of all pertinent phases and the associated transition data (and related parameters) for an object under consideration. For example, as mentioned, the phase configuration object 300 includes a phase table TF, populated as a result of entering or otherwise defining the phases F of the desired workflow, and a transition table TT, populated based on the phase table and based on input of the application developer to identify permitted transitions. The depicted user interface advantageously provides the application developer with a structure that effectively identifies all pertinent phases and all relevant possible transitions (i.e., all possible transitions between any two relevant phases), such that the application developer need only identify which transitions are permitted, and whether automatic (A) or manual (M) actions are to be taken for each transition. By interacting with the different tabs 301, the application developer can access different configuration layouts for the transition table TT and phase table TF and parameters for each permitted transition.

In particular, when tab 301c is selected, a tab (user interface) is displayed showing a representation of the phase matrix TS. This interface provides the application developer with a means for entering, modifying or deleting transitions permitted by the phase management object 300. The interface includes a graphical representation of the transition matrix TS, having the various relevant phases of the particular case type presented as both of row and column selections. Thus, in the print example from FIGS. 1A-1B, the transition matrix is a 5×5 matrix where each of the columns corresponds to a respective one of phases F1-F5 and each of the rows corresponds to a respective one of phases F1-F5. Consequently, entries of the transition matrix TS define all possible transitions T between any two phases F. Tab 301c provide a button 302 to load an array of transitions TS for a given case type, as well as a button 303 to save the transition matrix TS with any definitions or values that have been defined by the application developer.

FIG. 11 shows this phase management object 300 as now populated with permitted transitions defined at row/column intersections with either an "M" for manual (306) or an "A" for automatic (307), to define an action parameter for each permitted transition. As shown, a transition is defined as permitted only if an action parameter is specified; for example, row-column value 1-2 corresponds to a manual action parameter used for configuring a manual transition from phase F1 to phase F2. The transition matrix presented by the phase management object 300 is advantageously structured so that the application developer can select a cell identifying any desired transition and enter (e.g., guided by an appropriate dialog) the action parameter of any permitted transition. A manual transition, once again, is one where human intervention is required, for example, by clicking a confirmation button to proceed; by contrast, an automatic transition encompasses all non-manual transitions (i.e., where a transition is not conditioned on user intervention, such as, for example, in the case of an automated integration with an external system).

FIG. 11 illustrates for the depicted hypothetical that there are six allowed phase transitions. Using the phases of "data entry," "print document," "correction," "sync" and "case closed" from FIGS. 1A and 1B, and the transitions explicitly designated by those FIGS., the transition matrix TS would be populated with the following further entries:

a manual transition T12, from phase F1 ("Data entry") to phase F2 ("Print document");
an automatic transition T23 from phase F2 ("Print Document") to phase F3 ("Sync");
a manual transition T24 from phase F2 ("Print Document") to phase F4 ("Correction");
a manual transition T42 from phase F4 ("Correction") to phase F2 ("Print document"); and an automatic transition T45 from phase F4 ("Correction") to phase F5 ("Case closed"); note transition T45 represents two different process transition points between the same originating and destination phases.

A transition T is either allowed or rejected while progressing between the various ticket states as the desired workflow process is being executed. Progression can differ significantly depending on specific implementation (e.g., user intervention on the interface side, workflow, trigger, or integration with external services via a network). Thus, according to the settings of the transition table TT, specifically, whether an action parameter is provided for a particular phase transition or not, the teachings herein described provide a handle to perform a low level consistency check when the workflow is executed; more specifically, a desired transition is allowed or rejected according to the current phase of the ticket by reference to transition table entries when a trigger is fired. A trigger is the well-known database feature of automatically executing procedural code in response to certain events on changing of a record (such as add, update or delete operations). The use of triggers will be further discussed below.

This configuration of the phase management object 300 has an immediate effect on the workflow upon being saved, such that any attempted transition not matching an transition matrix TS entry or transition table TT record is rejected (or prohibited), preventing for example inappropriate update of a database record. For example, if the case object 500 (or another object) was incorrectly configured in a manner that might call for a disallowed transition, a low level consistency check to the transition table and appropriate escape mechanism is effective to disable the attempted transition. In other words, a consistency check trigger provides an effective control to reject inconsistencies in the developed application at run-time, and also allows a system administrator to safely perform mass data update without compromising overall workflow integrity. Note that some exemplary trigger processes will be discussed further below in reference to FIGS. 17, 18 and 19.

Referring once again to FIG. 3B, operation 257 enables the application developer to provide for the display of one or more commands on screen (e.g. buttons, command options or action links) in association with each permitted transition. The application developer's configuration of these features forms a part of the visual layout for a case object 500 being operated upon or executed during workflow execution and helps present available commands in a manner that is context-specific. Such buttons, commands or action links typically relate to functions that advance the workflow to a different phase, or otherwise assist in performing a phase transition (e.g., by updating a database record or case object).

Figure 13:
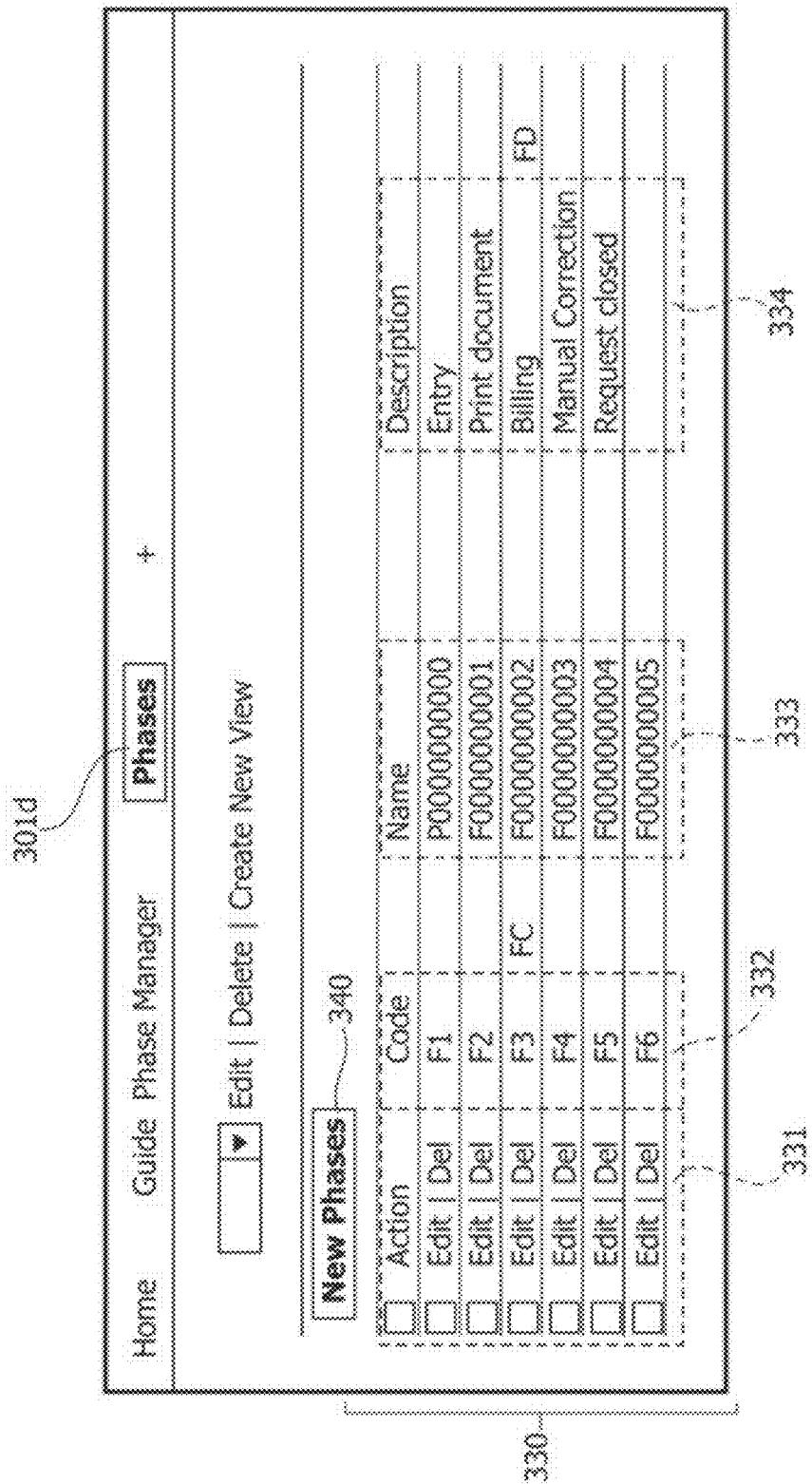
FIG. 13 shows a user interface employed to edit phase definition according to an exemplary embodiment.
Figure 14:
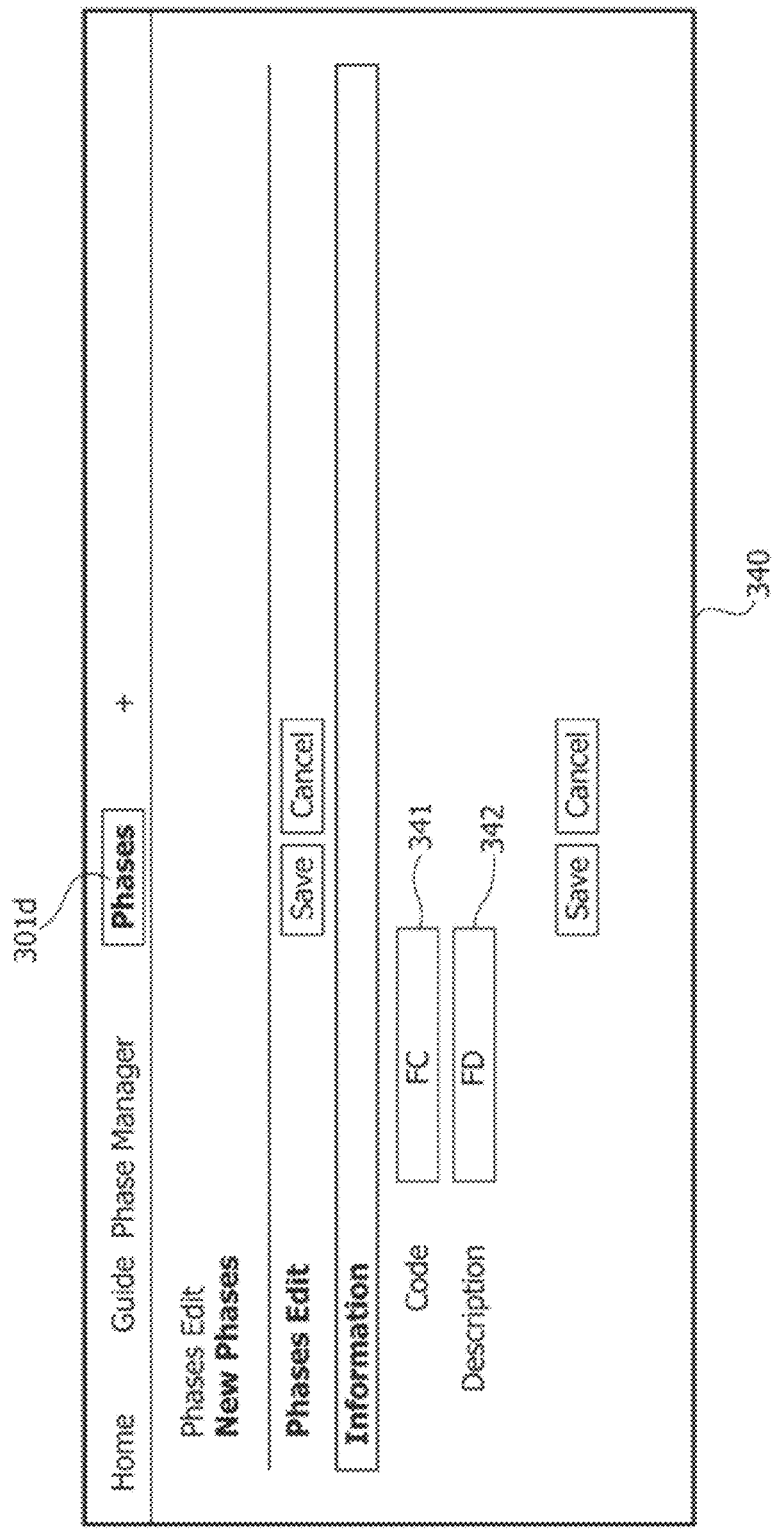
FIG. 14 shows a user interface associated with phase definition; this interface is invoked responsive to selection of a "new phase" button 340 from FIG. 13.

In connection with definition of pertinent phases, the phase tab 301d is used to assign to each phase a unique identifier, e.g., a phase code FC as identified above. The use of such a proxy simplifies the configuration and maintenance of system documentation. The depicted tab (see FIG. 13) provides a customized sub-object that stores all phase code-description pairs, displayed as a list 330. The list provides an option 331 to edit or delete any existing phase code, and identification of phase 332, name 333 and description 334. The tab 301d is also seen to include a command 340 to insert a new phase code which, if selected, causes the presentation of the user interface seen in FIG. 14.

Figure 15:
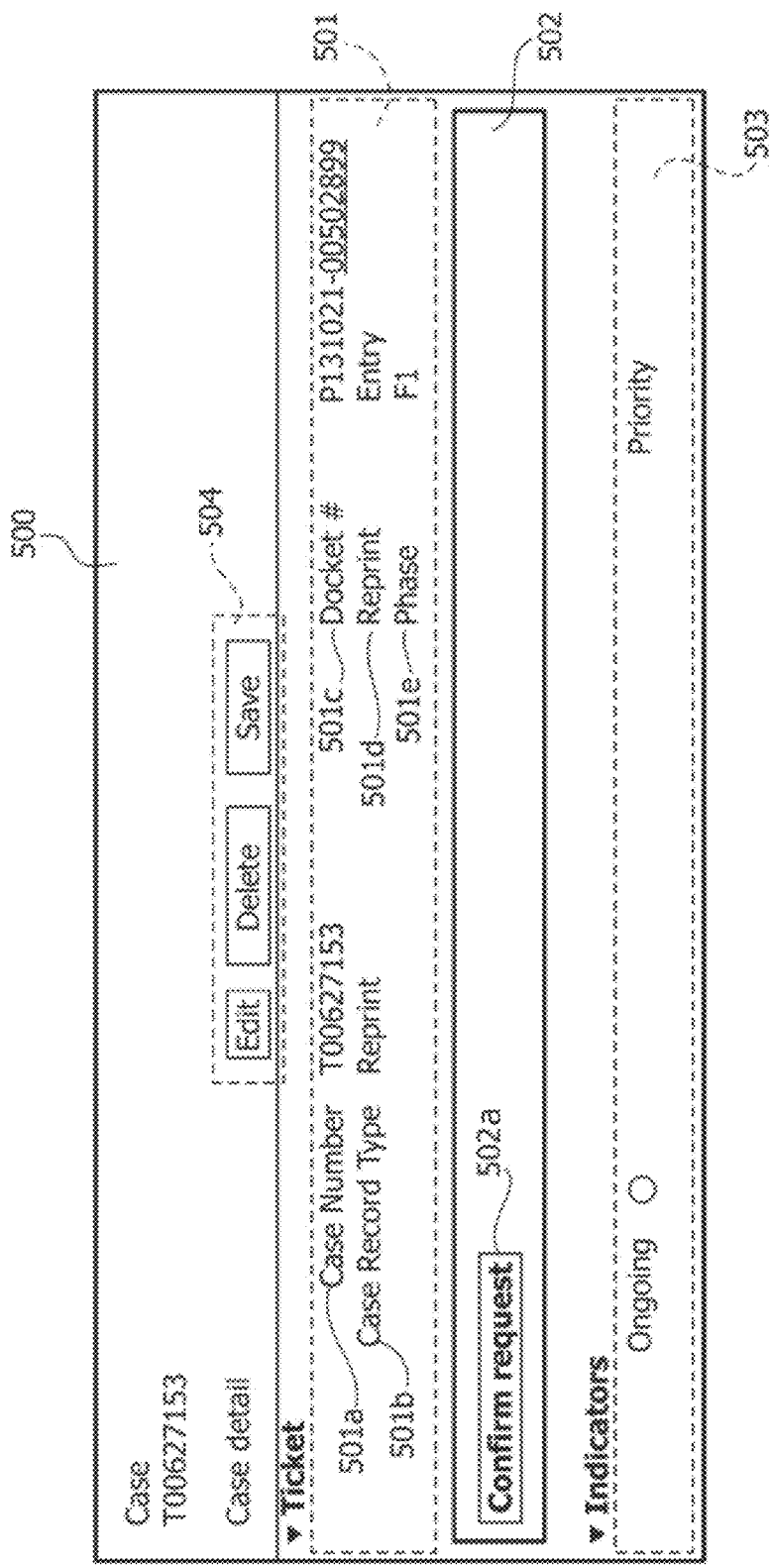
FIG. 15 shows layout of an object that provides case detail, according to an exemplary embodiment.

FIG. 15 shows a representation of a visual layout for a case object 500 (e.g., documenting initiation of a customer ticket). As depicted, this object provides an end-user with an interface that includes sections for displaying and inputting or modifying data and for issuing commands. The depicted layout includes a reference section 501, showing information related to the ticket (such as a case filing number 501a, a reference to case type 501b, a reference to the docket number 501c, a reference to phase description 501d for the phase the ticket is currently in, and a reference to a phase code 501e). The layout also provides a status indicator 503, used to signal that the service request has been accepted (503a) or has priority (503b), and a first command area 504, used to group available commands, such as the depicted "edit," "delete" and "save" commands. The layout also advantageously provides for a second command area 502, separated from the first command area 504, to display a set of context-specific commands pertinent to the workflow, as defined in connection with any permitted manual transitions for a current phase of operation (as defined by the transition matrix TS). Thus, while the first command area 504 displays a predetermined set of commands or buttons that typically are not varied based on context, the second command area 502 is used to display a variable number of context-specific commands according to current phase and any manual action conditions specified by the phase management object.

For example, the second command area 502 can provide a window for use by a Visual force component that is natively integrated in the case object 500. The Visual force component provides for a dynamic page that is executed to display buttons, commands or action links according to ticket status, namely according to the current phase of workflow and any conditions specified by the application developer. This structure facilitates providing end-users with a process for performing actions on an open ticket in a guided manner and in a manner compatible with desired constraints of the particular workflow process.

FIG. 15 is seen to depict in area 502 a specific action button 502a ("confirm request"). In order to make this command available as an option to end-users, an application developer interacts with a transition table TT and the action configuration tool 400 as was described above in reference to FIG. 12 to designate the pertinent transition matrix cell as having a permitted, manual action. That is, returning briefly to FIGS. 11 and 12, in order to provide for the availability of action button 502a to end-users, the application developer would access the transition matrix TS) see FIG. 11) and designate the second column of the first row (representing transition from phase F1 to phase F2) and interact with that cell to enter an "M;" by highlighting the cell (such as by pushing a command button or double-clicking a mouse), the application developer would access an action configuration tool dialog (as shown by numeral 400 of FIG. 12) and enter a label ("confirm request," at numeral 403) and configure remaining parameters. The application developer stores the configured transition parameters, and the end-user is then allowed at workflow run-time to trigger advance of the workflow by satisfying the specified condition (in this case, clicking on the presented action button to confirm phase transition). As should be apparent, the various dialogs and associated user interfaces permit the application developer to define conditions and commands associated with any pertinent transition or transition option. Note that as seen in FIG. 12, the title bar 401 of the ensuing dialog identifies the currently selected phase transition T (i.e., as a transition from F1 to F2). In FIG. 12, a button labelled "new manual transition [M]" permits the application developer to configure an appropriate new command as an actionable button. The layout also displays a list of previously added buttons and permits their deletion as represented by action button 402.

In a details section seen in FIG. 12 below the contemplate action buttons, it is possible as mentioned to configure the label of the button and otherwise to customize the way in which the button will be presented to an end-user. For example, depicted checkboxes 404a and 404b can be selected to provide for end-user presentation of buttons for:

A "link" specifying a URL or other network resource identifier (e.g. Salesforce.com) where the end-user can be redirected; and/or A "confirm on click" button 404b that presents a final confirmation command for the end-user to trigger a phase change or data update.

Other commands can also be configured by the application developer using section 405 to set conditions or section 406 to perform updates. It is also possible to provide for other types of commands or actions. As an example, in a typical workflow, and end-user might be called upon to either confirm acceptability of transition from a first phase (e.g., "F1") to a second (e.g., "F2"), or to otherwise update certain fields of the particular case object (e.g., ticket). That is, first per section 405, it is possible to generate actionable buttons which are dependent on dynamic conditions. For example, an action button can be configured such that it is displayed only to specific end-users (i.e., as determined by reference to an accessing end-user's profile and determining whether that profile satisfies defined criteria) or only once certain conditions have been satisfied. As depicted, the "conditions" section 405 permits an application developer to define up to five different logic conditions, with configuration of conditions achieved using drop down lists and check boxes for parameters of field, operator and value, respectively. The field parameter 405a is seen to permit drop-down list selection of a particular operand for the desired condition, typically a field of the case object, whereas the operator parameter 405b permits the application developer to define logical operation to be performed on the selected field (e.g., "subject=null") in order to test contents of any pertinent object field for a predetermined requirement. Note that the depicted action configuration tool dialog 400 can optionally be structured in any desired manner, for example, permitting definition of complex Boolean conditions (for example, combining multiple logical AND and/or OR operations) to implement comparisons, checks and other logic and to be satisfied as a condition precedent for transition. The action configuration tool dialog is also structured to permit the application developer to instruct the update of select fields of the case object (i.e., in addition to simply commanding a phase change). That is, the "update actions" section 406 of the action configuration tool 400, once enabled by selecting checkbox 406a, permits an application developer to define fields and values for the update, including system values such as null, TODAY, as entries of a pick-list or a date.

Returning to FIG. 15, the effect of transition table editing as just described is to generate an action button in the second command area 502, in a manner that:

is specific to case type (i.e., record-type, as implicit to the described process);

identifies current phase F of a ticket; and permits selective implementation of an application developer-defined number of conditions as joint conditions (satisfaction of each is required), disjoint conditions (satisfaction of any one condition is required), or a combination of the two, and to define any pertinent actions such as updates.

The above-described embodiments permit the application developer to configure and reconfigure a desired workflow with only a point and click mechanism or other user device, without requiring any specific coding effort.

Once configuration is completed, the "store transition" button 407 allows the application developer to store all the settings made for the transition table TT (including all manual and automatic transition definitions) between any two phases F, in a manner linked to the transition matrix TS.

In other words, via the depicted transition matrix TS and the action configuration tool 400 (or similar user interfaces) the transition table TT is automatically populated with each defined, permitted transition T and conversely will be configured to prohibit any transition not specifically provided for. At any time, the application developer can end the configuration session provided by of the action configuration tool 400 dialog using a close object button 408.

Figure 16:
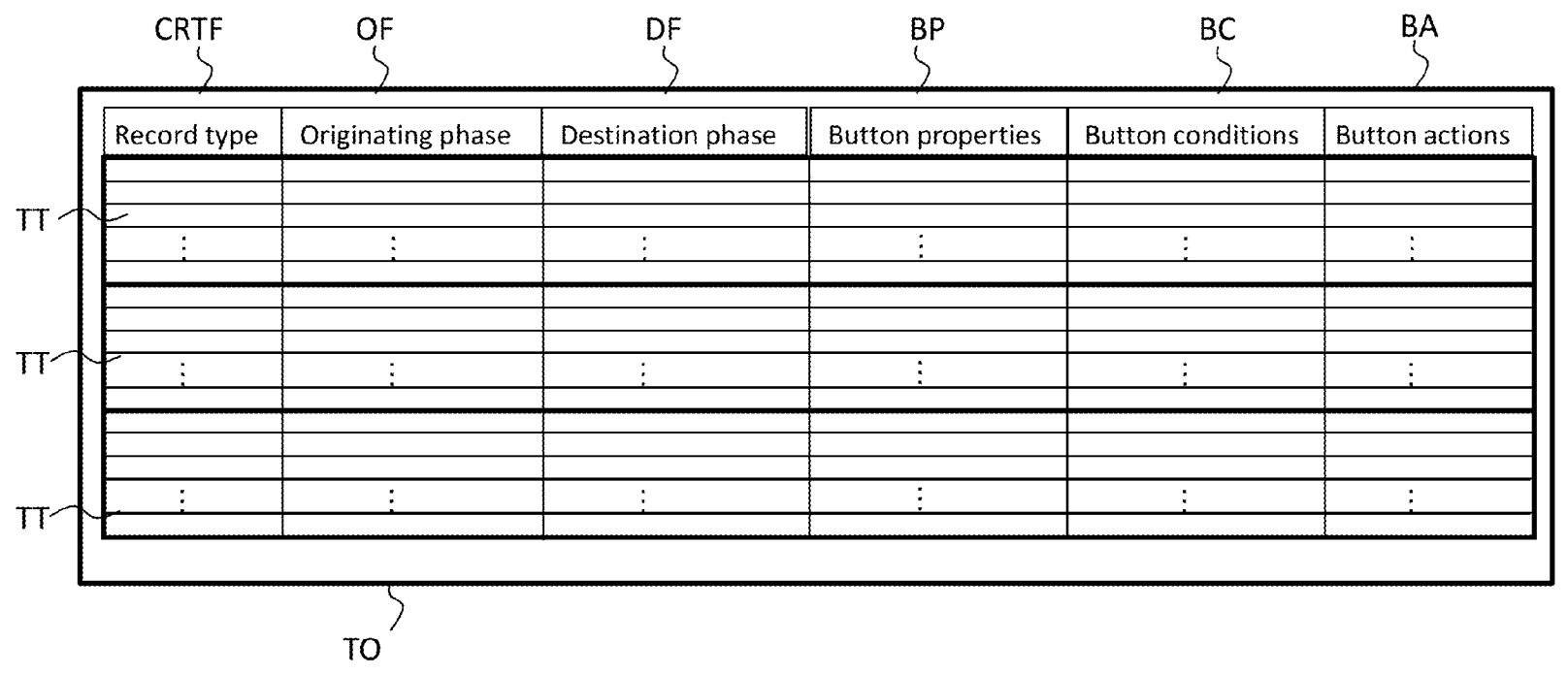

As an example, in one embodiment, the transition table TT is automatically updated upon selecting button 407 to generate, remove or overwrite a record for each transition T. An exemplary format for this table as a transition object TO is depicted in FIG. 16. Relative to the transition matrix TS discussed earlier, for instance, if the records corresponding to transitions T are arranged in rows, the fields of the configured action parameters are arranged in further columns. In this way, each transition table TT of the transition object TO, one table for each record-type, can have records (each represented by a row) that each contains entries identifying record-type CRTF, originating and destination phase (OF and DF, respectively), button properties BP, related conditions BC and button actions BA. The transition object TO represents a metadata structure capable of generating corresponding user interface commands according to current phase (i.e., originating phase OF) and transition T experienced by or available to an end-user for any desired workflow and associated record-type. To provide an example, a single transition table TT can include transitions T12, T23, T24 T42, T45 and T35 exemplified earlier in connection with FIGS. 1A and 1B. Note that in an alternative embodiment, transitions can be defined using the interface and associated dialog depicted by FIG. 16; other variations will also occur to those skilled in the art.

In other words, the phase management object 300, supplies by way of the transition matrix TS, the transition table TT or by another inputs means, methods for defining transitions to in a manner constraining end-user action in the desired workflow. The transition definitions can be optionally structured as a set of records, one for each transition, which define the associated actions and parameters in a readily understood manner, and in a manner which provides for ready editing (and workflow modification). In addition, as noted earlier, such a structure provides a ready means for implementing low level consistency checks to improve process and database integrity. Thus, in one embodiment, all the information relating to a certain transition can be accommodated in a respective record of a table of object including pertinent manual action parameters.

It was noted earlier that at various points in time, triggers can be executed to perform automatic actions on update, including low level consistency checks. Such triggers are represented in FIG. 3B by the acronyms TR1 and TR2. More specifically, as seen by an input to function block 250, a trigger can be executed any time a table or record that relates to phase definition is stored; similarly, during run-time of the workflow application, as end-users access case management objects (via run-time process 280), updates to object properties can also be used to trigger a pertinent consistency check. These operations are generally discussed with reference to FIGS. 17-19.

Figure 17:
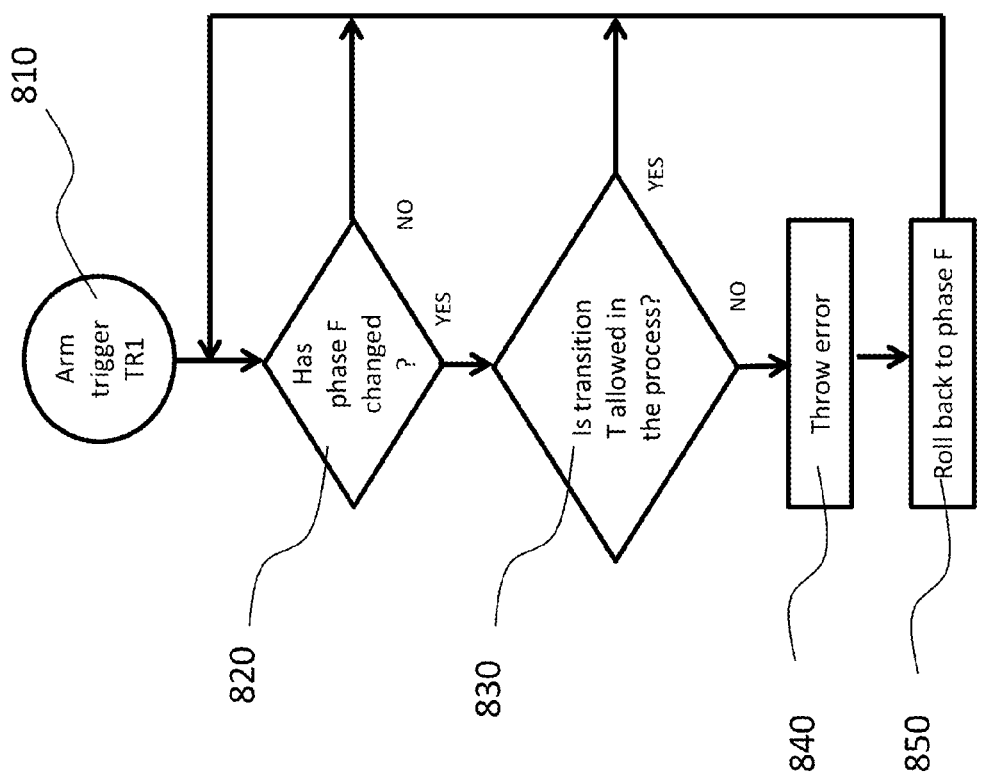
FIG. 17 is a flow diagram for a method of operation of a first trigger according to an exemplary embodiment.

In particular, as seen in FIG. 17, a first trigger TR1 can be activated (block 810) during workflow run time any time a request management object is updated or accessed and used to verify that, whenever a transition is attempted (block 820), there is a corresponding entry in the transition object TO which defines the attempted transition as a permitted transition (both in terms of originating and destination phase). This verification process is represented by decision block 830 in FIG. 17. If an exact match is not found, the attempted operation can be rejected (block 840) and the status of the system can be rolled back (block 850) by the workflow management system.

Figure 18:
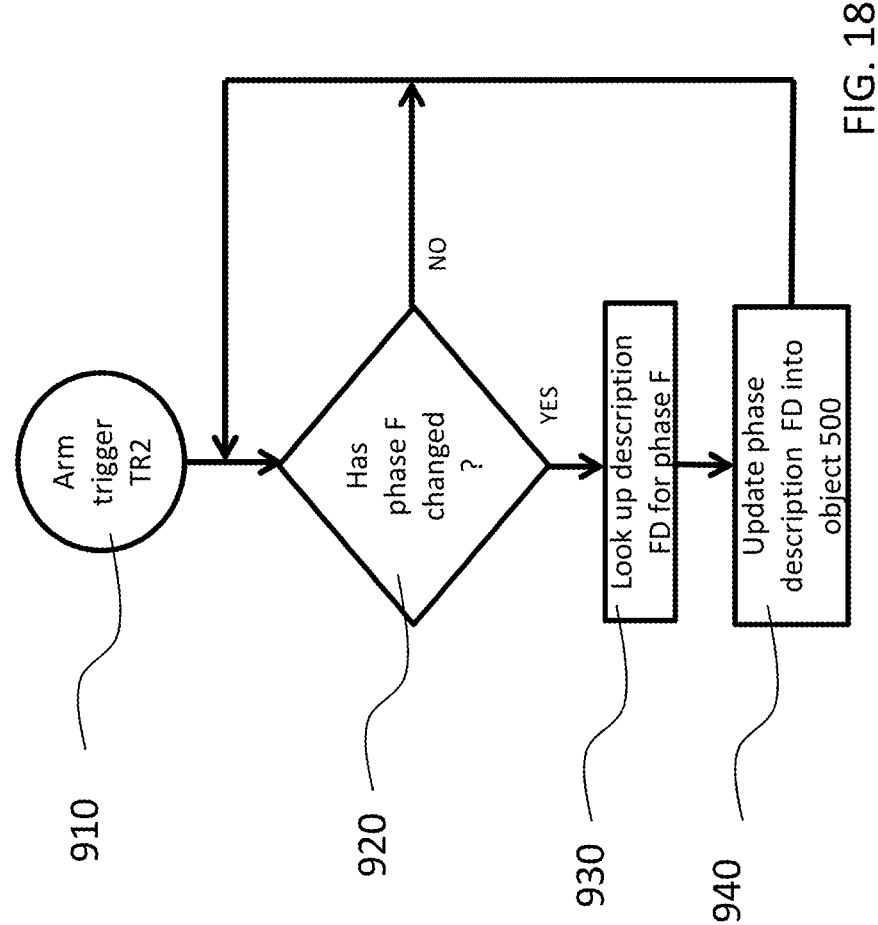
FIG. 18 is a flow diagram for a method of operation of a second trigger according to an exemplary embodiment.

FIG. 18 describes the operation of a second trigger, TR2, which is executed upon any attempt to update a phase table or an object defining phase, transition or any transition parameter. More specifically, this trigger can be activated (block 910) any time a pertinent object or table is updated or accessed, to ensure that a purported transition is associated to a properly-defined phase description. At step 920, the newly updated or defined table or object is checked in order to determine whether any phase-related (or transition-related) parameters have changed. If such a change is detected, the workflow design software looks up for the destination phase (for example, by looking up pertinent phase codes or transition descriptors from the transition table TT) to find the appropriate description to be applied to the field. Then in a step 940, the updated phase description is stored for the case object. This trigger provides an update of the phase description of the whenever the phase field CF in the request management object 500 changes by looking into the look up table searching for the phase codes to find the appropriate description to be applied to the field.

Figure 19:
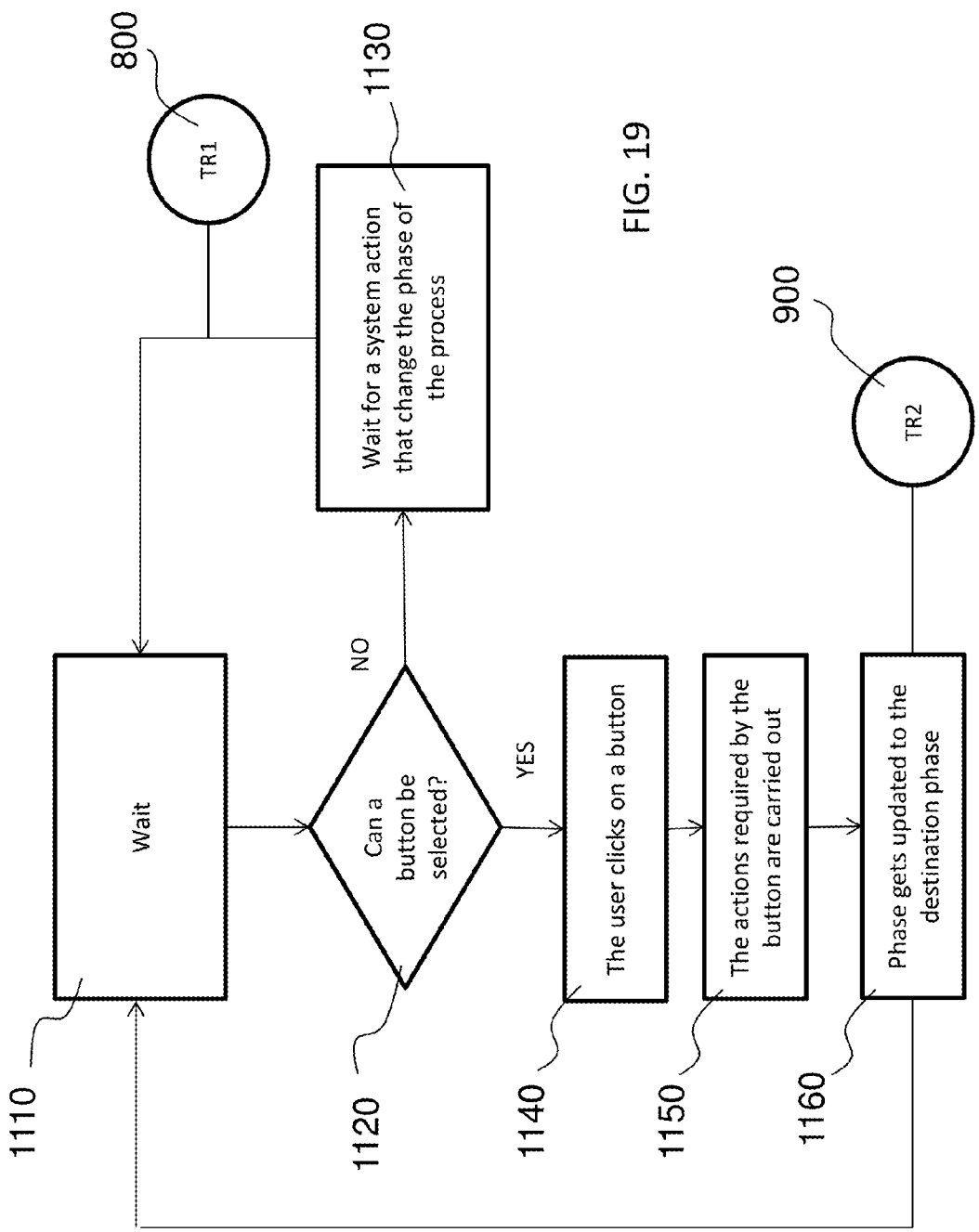
FIG. 19 is a flow diagram for a method of validating attempted transitions according to an exemplary embodiment.

FIG. 19 provides a flow diagram relating to the execution of operation 280 from FIG. 3B.

More specifically, at step 1110, the system remains in a wait state until an end-user is presented with any action buttons, commands or links in connection with a case object. As indicated by decision block step 1120, the software operates in a loop where it determines whether any buttons, commands and links are displayed and, if not (1130), whether a phase change has occurred relative to a previous state. If such a phase change occurs, the software invokes trigger TR1 as indicated by process circle 800. On the other hand, if the software detects presentation of end-user commands, the software monitors pertinent input devices to detect the issuance of a user command via one of the buttons, commands or links. This is represented by step 1140. If this is detected, per step 1150 the actions required by the clicked button, command or link are carried out. Per step 1160, at that time, the current phase is updated to value of the destination phase and the software executes process circle 900, corresponding to trigger TR2. As noted earlier, if the actions represented by step 1150 call for a prohibited state, the software (per FIG. 17) rolls back phase to the preexisting value, or otherwise inhibits the attempted transition from taking place.

As can be seen from the foregoing, embodiments discussed above provide for one or more of the following extensions or object/workflow management properties:

- a phase field CF and phase description field, which for example can be part of or otherwise added to a request management object 500;
- a custom object to define and store permitted transitions, action types (e.g., for automatic and manual transition definition), and any associated conditions or actions;
- a custom object to hold phase descriptions (tab 301*d* associated to phase table TF);
- a first trigger TR1 to check the phase compatibility upon ticket or record case update;
- a second trigger TR2 to automatically decode phase (phase code FC and phase description FD); and
- a custom section of the request management object 500 (e.g., command area 502) to display commands defined by a metadata set. In one embodiment, this custom section can be optionally implemented as a Visual force component/page.

Other implementations will no doubt occur to those skilled in the art which do not use these extensions.

In the description set forth above, specific details have been set forth in order to provide a thorough understanding of the select embodiments. In some instances, the terminology and symbols may imply specific details that are not required to practice those embodiments. The terms "exemplary" and "embodiment" are used to express an example, not a preference or requirement. In some instances, well-known materials or methods have not been described in detail in order to avoid obscuring the present embodiments.

Generally speaking, any of the processes or methods discussed herein can be embodied in the form of instructions stored on non-transitory machine-readable media e.g., as software. "Non-transitory machine-readable media" means any tangible (i.e., physical) storage medium, irrespective of how data on that medium is stored, including without limitation, random access memory, hard disk memory, optical memory, a floppy disk, DVD or CD, server storage, volatile memory and other tangible mechanisms where instructions may subsequently be retrieved by a machine. The machine-readable media can be in standalone form (e.g., a program disk) or embodied as part of a larger mechanism, for example, a laptop computer, portable device, server, network, printer, or other set of one or more devices. The instructions can be implemented in different formats, for example, as metadata that when called is effective to invoke a certain action, Java code or scripting, code written in a specific programming language (e.g., as C++ code, "Java," "JavaScript," "ActiveX," "VBScript," "Apex" or another language) or a processor-specific instruction set, or in some other form; the instructions can also be executed by the same processor or different processors, depending on embodiment. For example, in one implementation, instructions on non-transitory machine-readable media can be executed by a single computer, and in other cases as noted, can be stored and/or executed on a distributed basis, e.g., using one or more servers, web clients, or application-specific devices. Such instructions, or portions thereof, can also be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as is well known.

Various modifications and changes may be made to the embodiments presented herein without departing from the broader spirit and scope of the disclosure. For example, features or aspects of any of the embodiments may optionally be applied in combination with any other of the embodiments or in place of counterpart features or aspects thereof. Accordingly, the specification and drawings are to be regarded in an illustrative rather than a restrictive sense.

The invention claimed is:

1. A method of developing an application for execution in a workflow management system, the workflow management system including a database, the application defining a workflow that involves interaction with the database, the workflow being representable as phases of workflow and transitions between the phases, said method comprising:

providing an application development interface, including a transition table to be populated with data entries by at least one application developer, the data entries to define respective transitions between the phases of the workflow, the application development interface to permit the at least one application developer to select, for each data entry, one of an automatic or a manual action parameter; and automatically launching, if a manual action parameter is selected for a particular one of the respective transitions, an interface for the at least one application developer to define at least one condition to be satisfied to access the database;

wherein said application development interface is to automatically define metadata responsive to the selection of each action parameter and each condition, and is to associate the metadata with a corresponding one of the respective transitions;

wherein the method further comprises configuring the application to automatically invoke commands during workflow execution to effectuate the action parameters according to the metadata, responsive to a current phase of execution of the workflow;

wherein the providing of the application development interface includes providing a matrix of potential transitions between corresponding phases of the workflow, each potential transition being selectable by the at least one application developer to define a selected transition, and wherein automatically launching includes, concurrent with selection of each potential transition as a selected transition, defining each selected transition as having the one of the automatic or a manual action parameter; and wherein each selected transition constitutes a direct transition permitted between corresponding phases of the workflow, and wherein potential transitions from the matrix which remains unselected is not a permitted direct transition between the corresponding phases of the workflow.

2. The method of claim 1, wherein the database is a multitenant database and wherein the workflow is to permit during execution interaction between tenants and the multitenant database.

3. The method of claim 1, wherein said application development interface comprises a user interface and wherein the method further comprises configuring at least one of the application or the workflow management system to utilize a first trigger procedure to check said transition table to determine whether a transition is permitted.

4. The method of claim 1, wherein the application development interface further comprises a user interface to permit at least one of editing of one of the phases of the workflow, definition of a new phase of the workflow, or deletion of one of the phases of the workflow.

5. The method of claim 1, further comprising configuring the application development interface to provide automatic identification and display of information defining a current phase of the workflow.

6. The method of claim 1, wherein the workflow management system is distributed by a third party and wherein the method comprises providing configuration software to customize at least one of software of the third party or an object to be operated upon by the third party software, to configure the at least one of the software of the third party or the object to be operated upon by the third party software to represent as an operand at least one of the phases of workflow.

7. The method of claim 1, wherein providing the application development interface includes automatically populating the matrix with potential transitions between the phases of the workflow.

8. The method of claim 1, wherein providing the application development interface includes providing a command to the at least one application developer to selectively perform at least one of:
configuration of a label of an end-user command;
definition of a condition precedent to displaying an end-user command;
update of at least one field; and
update of one of the respective transitions.

9. The method of claim 8, further comprising configuring the metadata to cause the display of the command via a first visualization mechanism, distinct from a second visualization mechanism used to display one or more workflow agnostic commands.

10. The method of claim 1, wherein the workflow represents a customer relationship management workflow (CRM) and wherein the method further comprises providing a user interface to permit selective modification of a request management object of the workflow management system to add a record-type field.

11. An apparatus to assist with generation of an application for execution in a workflow management system, the workflow management system including a database, the application defining a workflow that involves interaction with the database, the workflow representable at least in part as phases and transitions between phases, said apparatus comprising:
means for providing an application development interface, including a transition table to be populated with data entries by at least one application developer, the data entries to define respective transitions between the phases of the workflow, the application development interface to permit the at least one application developer to select, for each data entry, one of an automatic or a manual action parameter; and
means for automatically launching, if a manual action parameter is selected for a particular one of the respective transitions, an interface for the at least one application developer to define at least one condition to be satisfied to access the database;
wherein said application development interface is to automatically define metadata responsive to the selection of each action parameter and each condition, and is to associate the metadata with a corresponding one of the respective transitions;
wherein the apparatus further comprises means for configuring the application to automatically invoke commands during workflow execution to effectuate the action parameters according to the metadata, responsive to a current phase of execution of the workflow;
wherein the means for providing the application development interface includes means for providing a matrix of potential transitions between the phases, each potential transition being selectable by the at least one application developer to define a selected transition, and for currently defining each selected transition as having the one of the automatic or a manual action parameter; and
wherein each selected transition constitutes a direct transition permitted between corresponding phases of the workflow, and wherein potential transitions from the matrix which remains unselected is not a permitted direct transition between the corresponding phases of the workflow.

12. An apparatus to assist with generation of an application for execution in a workflow management system, the workflow management system including a database, the application defining a workflow that involves interaction with the database, the workflow representable at least in part as phases and transitions between phases, said apparatus comprising instructions stored on non-transitory machine readable media, the instructions when executed to cause at least one processor to:

provide an application development interface, including a transition table to be populated with data entries by at least one application developer, the data entries to define respective transitions between the phases of the workflow, the application development interface to permit the at least one application developer to select, for each data entry, one of an automatic or a manual action parameter; and automatically launch, if a manual action parameter is selected for a particular one of the respective transitions, an interface for the at least one application developer to define at least one condition to be satisfied to access the database;

wherein said application development interface is to automatically define metadata responsive to the selection of each action parameter and each condition, and is to associate the metadata with a corresponding one of the respective transitions;

wherein the instructions when executed are further to configure the application to automatically invoke commands during workflow execution to effectuate the action parameters according to the metadata, responsive to a current phase of execution of the workflow;

wherein the instructions when executed are further to cause the at least one processor to provide a matrix of potential transitions between the phases, each potential transition being selectable by the at least one application developer to select the one of the automatic or a manual action parameter; and wherein each selected transition constitutes a direct transition permitted between corresponding phases of the workflow, and wherein potential transitions from the matrix which remains unselected is not a permitted direct transition between the corresponding phases of the workflow.

13. The apparatus of claim 12, wherein the database is a multitenant database and wherein the workflow is to permit during execution interaction between tenants and the multitenant database.

14. The apparatus of claim 12, further comprising instructions that, when executed, are to implement in the workflow management system a first trigger procedure to check said transition table to determine whether a transition is permitted.

15. The apparatus of claim 12, wherein the application development interface further comprises a user interface to permit at least one of editing of one of the phases of the workflow, definition of a new phase of the workflow, or deletion of one of the phases of the workflow.

16. The apparatus of claim 12, wherein the workflow management system is distributed by a third party and wherein the instructions are embodied as configuration software to customize at least one of software of the third party or an object to be operated upon by the third party software, to configure the at least one of the software of the third party or the object to be operated upon by the third party software to represent as an operand at least one of the phases of workflow.

17. The apparatus of claim 12, wherein the instructions, when executed, are further to cause the at least one processor to automatically populate the transition matrix with potential transitions between the phases of the workflow.

18. The apparatus of claim 12, wherein the workflow represents a customer relationship management workflow (CRM) and wherein the apparatus further comprises instructions that, when executed, are to provide for selective modification of a request management object of the workflow management system to add a record-type field.

* * * * *